(12) United States Patent
Miller et al.

(10) Patent No.: US 8,235,294 B2
(45) Date of Patent: Aug. 7, 2012

(54) ACCURACY-ENHANCED SCANNER

(75) Inventors: Timothy Miller, Scotts Valley, CA (US);
Bobby Dale Gifford, Hayward, CA (US); Leonard Ott, Livermore, CA (US); John E. Brandon, San Rafael, CA (US)

(73) Assignee: Socket Mobile, Inc., Newark, CA (US)

( * ) Notice: Subject to any disclaimer, the term of this patent is extended or adjusted under 35 U.S.C. 154(b) by 495 days.

(21) Appl. No.: 12/419,583

(22) Filed: Apr. 7, 2009

(65) Prior Publication Data

US 2009/0266898 A1    Oct. 29, 2009

Related U.S. Application Data

(63) Continuation-in-part of application No. 12/200,512, filed on Aug. 28, 2008, now Pat. No. 7,686,227, which is a continuation of application No. 11/082,190, filed on Mar. 16, 2005, now Pat. No. 7,429,000, which is a continuation of application No. 12/419,583, filed on Apr. 7, 2009, and a continuation-in-part of application No. 11/949,651, filed on Dec. 3, 2007, now Pat. No. 7,942,326.

(60) Provisional application No. 60/554,080, filed on Mar. 17, 2004, provisional application No. 60/868,338, filed on Dec. 3, 2006, provisional application No. 61/043,094, filed on Apr. 7, 2008.

(51) Int. Cl.
*G06K 7/10* (2006.01)

(52) U.S. Cl. ........... 235/472.02; 235/462.46; 235/462.48
(58) Field of Classification Search ............. 235/472.02, 235/462.11, 462.41, 462.46, 462.24, 462.48
See application file for complete search history.

(56) References Cited

U.S. PATENT DOCUMENTS

| | | | |
|---|---|---|---|
| 6,098,877 A * | 8/2000 | Barkan et al. | 235/25 |
| 6,853,293 B2 * | 2/2005 | Swartz et al. | 340/5.92 |
| 7,010,501 B1 * | 3/2006 | Roslak et al. | 705/23 |
| 7,559,473 B2 * | 7/2009 | He | 235/462.2 |

* cited by examiner

*Primary Examiner* — Edwyn Labaze
(74) *Attorney, Agent, or Firm* — PatentVentures; Bennett Smith; Korbin Van Dyke

(57) ABSTRACT

An accuracy-enhanced scanner provides (in response to a first user input) illumination of potential scan targets and scans (in response to a second user input) a selected scan target. The user uses the illumination to aim the scanner at the selected scan target in between providing the first and the second user inputs. The scanner has switches to communicate the user inputs, to specify an operating mode for the scanner, and/or to communicate information codes to a computing device. The scanner has one or more scan engines (such as a barcode reader or an RFID tag reader), and optionally communicates wirelessly with the computing device. A scanning system including the scanner optionally provides feedback to the user based on feedback from a host processor. The scanner is any of a Multi-Mode Ring Scanner (MMRS), a cordless hand scanner, or a Personal Digital Assistant (PDA) with an add-on scanner.

28 Claims, 14 Drawing Sheets

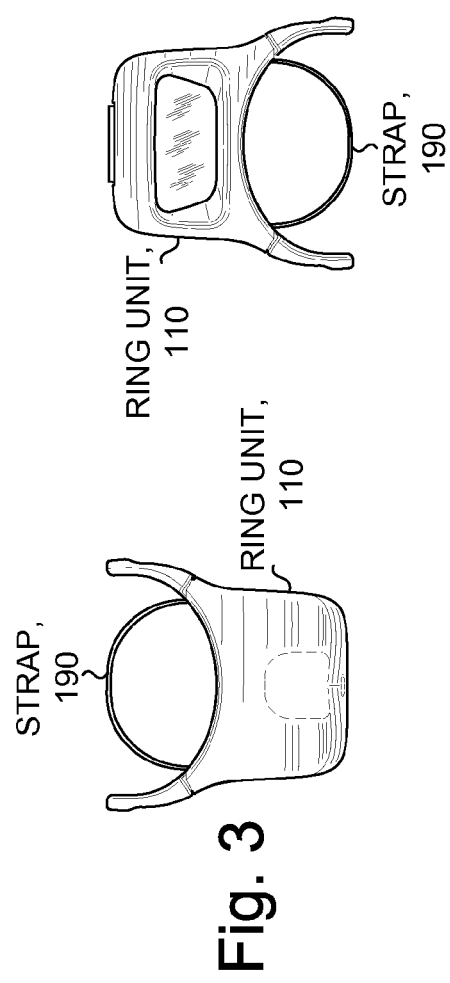
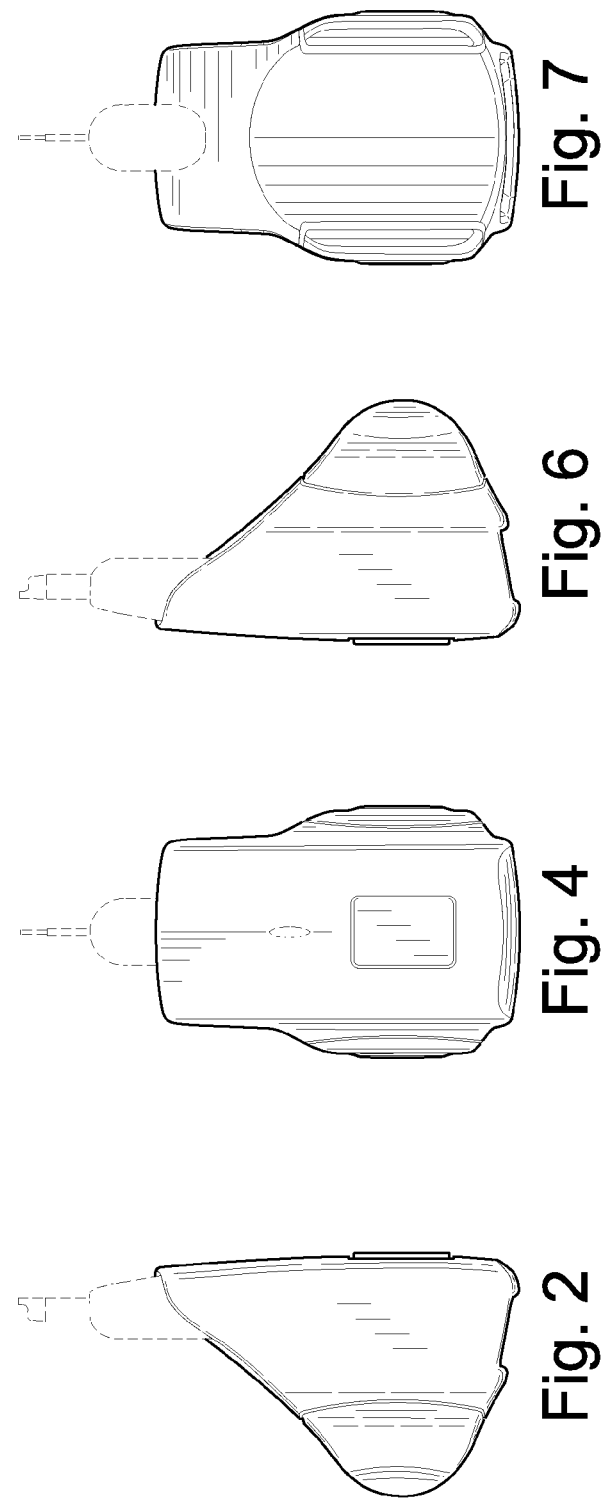

ACCURACY-ENHANCED SCANNER

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application Ser. No. 60/554,080, filed Mar. 17, 2004, first named inventor Leonard Ott, and entitled CORDLESS HAND SCANNER WITH IMPROVED USER FEEDBACK;

U.S. Pat. No. 7,429,000 B1, Ser. No. 11/082,190, filed Mar. 16, 2005, first named inventor Leonard Ott, and entitled CORDLESS HAND SCANNER WITH IMPROVED USER FEEDBACK;

U.S. Provisional Application Ser. No. 60/868,338, filed Dec. 3, 2006, first named inventor Robert J. Miller, and entitled MULTI-MODE RING SCANNER;

U.S. Non-Provisional application Ser. No. 11/949,651, filed Dec. 3, 2007, first named inventor Robert J. Miller, and entitled MULTI-MODE RING SCANNER;

U.S. Provisional Application Ser. No. 61/043,094, filed Apr. 7, 2008, first named inventor Timothy Miller, and entitled ACCURACY-ENHANCED SCANNER;

U.S. Non-Provisional application Ser. No. 12/200,512, filed Aug. 28, 2008, first named inventor Leonard Ott, and entitled CORDLESS HAND SCANNER WITH IMPROVED USER FEEDBACK;

BACKGROUND

1. Field

Advancements in scanning devices are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

BRIEF DESCRIPTION OF DRAWINGS

FIGS. 2 to 7 illustrate selected details of an embodiment of a ring unit of an MMRS (with applicability to an accuracy-enhanced MMRS embodiment), showing differing views.

DETAILED DESCRIPTION

Figure 1:
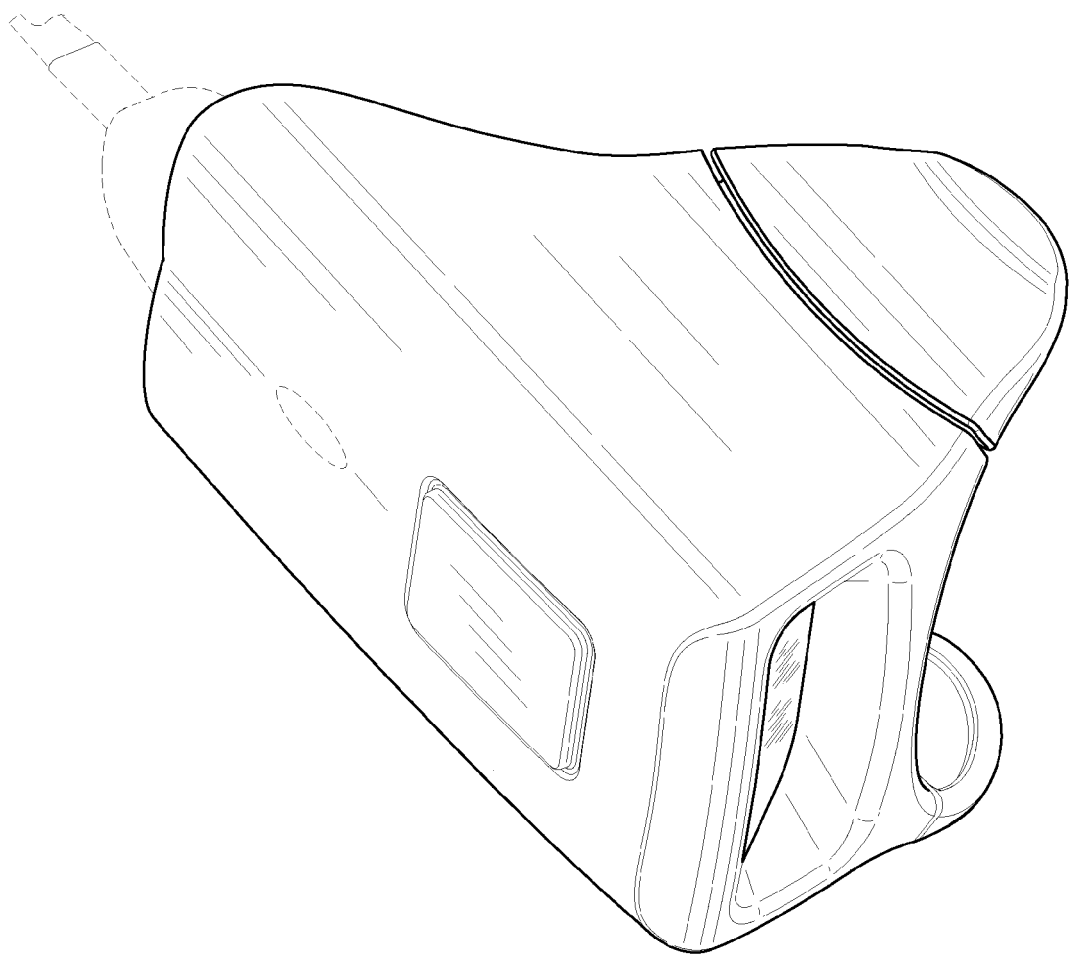
FIG. 1 illustrates selected details of an embodiment of a ring unit of a Multi-Mode Ring Scanner (MMRS) (with applicability to an accuracy-enhanced MMRS embodiment), showing a three-dimensional view of the top, the front, and the left side.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Multiple types of scanners/readers are in use today, including optical scanners and RFID tag readers. Optical scanning devices have been implemented in a variety of form factors, including some wearable forms. Current optical scanners are generally single function and/or lack flexible ways of providing dynamic user input. Further, cordless (wireless) handheld scanners promise users greatly improved convenience, flexibility, and efficiency over previous corded scanners. The scan engines within such hand-held scanners function quite reliably. The wireless links, in and of themselves, also are reliable and generally have robust error correction. Nevertheless, the overall path between the scan engine and the host processor (receiving the scan data) relies upon a number of more or less independent components and may use a variety of links, with varying degrees of reliability and error detection. Furthermore, the host processor may be busy or otherwise not available. Thus, a successful scan by the scan engine does not in itself assure a successful scan received by the host processor. If the user has grown accustomed to a corded scanner, then user confidence (and thereby user acceptance) in using a cordless scanner may also be lacking simply due to unfamiliarity. Increased user confidence and acceptance for cordless hand-held scanners and increased system performance and reliability may be obtained through improved user feedback in accordance with the teachings herein. In an illustrative embodiment, the state of one or more indicators on the cordless scanner is changed as a result of feedback from a coupled host processor. This is in contrast to previous scanners where scan confirmation indicators were based simply on whether the scan engine alone performed a successful scan. Obtaining timely confirmation that the host processor has received the scan successfully (or not) leads to increased confidence in, and acceptance of, the cordless hand-held scanner and more adept use thereof. Additionally, enhanced-accuracy scanning further improves user confidence and acceptance of cordless hand-held scanners. The enhanced-accuracy scanning includes techniques such a user requesting illumination and in response a scanner providing the illumination. The user then adjusts where the scanner points (for example by aiming the scanner based on where the illumination appears with respect to a target). Then the user requests a scan and in response the scanner performs a scan of the target.

An accuracy-enhanced scanner is enabled to provide illumination of potential scan targets, in response to a first user input, and further enabled to scan a selected scan target, in response to a second user input. The user uses the illumination to aim the scanner at the selected scan target in between providing the first and the second user inputs. The scanner includes a plurality of switches to communicate the user inputs, to specify an operating mode for the scanner, and/or to communicate information codes to a computing device. The computing device is optionally enabled to assign functions to various combinations of activation of the switches. The scanner has one or more scan engines (such as a barcode reader or an RFID tag reader), and optionally communicates wirelessly with the computing device. A scanning system including the scanner optionally provides feedback to the user based on feedback from a host processor. The scanner is any of a Multi-Mode Ring Scanner (MMRS), a cordless hand scanner, or a Personal Digital Assistant (PDA) with an add-on scanner. MMRS implementations have a ring unit for wearing on a digit (such as a finger), and optionally a coupled wrist unit. The ring unit includes the scan engine, and optionally implements the switches as two paddle switches for activation by inward pressure from digits adjacent to the digit. Cordless hand scanner implementations have a housing that is convenient for holding the scanner with a single hand, and optionally implement the switches on opposing surfaces of the housing, for activation by one or more digits of the hand. PDA implementations optionally implement some of the switches as soft buttons on a touch- and/or pressure-sensitive panel and/or screen.

Acronyms

Elsewhere herein various shorthand abbreviations, or acronyms, are used. The descriptions of at least some of the acronyms follow.

| Acronym | Description |
| --- | --- |
| ASCII | American Standard Code for Information Interchange |
| CCD | Charge Coupled Device |
| CTS | Clear To Send |
| ESE | Extended SSI Engine |
| LAN | Local Area Network |
| LED | Light Emitting Diode |
| MMRS | Multi-Mode Ring Scanner |
| PAN | Personal Area Network |
| PC | Personal Computer |
| PCB | Printed Circuit Board |
| PCI | Peripheral Component Interconnect |
| PDA | Personal Digital Assistant |
| RE | Radio Frequency |
| RFID | Radio Frequency IDentification |
| RTS | Request To Send |
| S2H | Scanner-to-Host |
| SD | Secure Digital |
| SSI | Simple Serial Interface |
| UFL | User Feedback Logic |

| Acronym | Description |
| --- | --- |
| USB | Universal Serial Bus |
| UWB | Ultra Wide Band |
| WAN | Wide Area Network |
| WLAN | Wireless Local Area Network |
| WM | Wireless Module |
| WPAN | Wireless Personal Area Network |

EXAMPLE EMBODIMENTS

In concluding the introduction to the detailed description, what follows is a collection of example embodiments, providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

In some embodiments, an MMRS has a wrist unit and a ring unit coupled by a cable. In various embodiments, the cable is a flat cable, a ribbon cable, a coaxial cable, or a coiled cable or a bundle of wires, optionally enclosed in a sheath. In various embodiments, the cable is permanently fixed to the wrist unit and is detachable from the ring unit, or alternatively the cable is permanently fixed to the ring unit and is detachable from the wrist unit. In some embodiments, the cable is adapted to reduce slack between the wrist unit and the ring unit, such as via implementing the cable as a stretchable cable, a z-fold cable, a serpentine cable, or a coiled cable. In some embodiments, the cable is detachable from either or both of the wrist unit and the ring unit. In some embodiments, the ring unit is worn on a finger of a user. In some embodiments, the wrist unit is worn on a wrist (or forearm) of a user. In some embodiments, the wrist unit is adapted to be worn on a belt, or attached to a waist or another part of a body of a user.

In some embodiments, an MMRS has a wrist unit and a ring unit connected by a detachable cable. In other embodiments, an MMRS has a wrist unit and a ring unit coupled via wireless transceivers, such as Bluetooth transceivers. In some embodiments, the wrist unit has a communications mechanism for communicating with a network and/or a computing device. In various embodiments, the communications mechanism is one or more of a Bluetooth transceiver, an 802.11 wireless transceiver, a ZigBee transceiver, a UWB transceiver, a WLAN or WPAN transceiver, or an infrared transceiver.

In some embodiments, an MMRS has a ring unit, the ring unit having a communications mechanism for communicating with a network and/or a computing device. In various embodiments, the communications mechanism is one or more of a Bluetooth transceiver, an 802.11 wireless transceiver, or an infrared transceiver.

In various embodiments, a ring unit of an MMRS has one or more of an optical scanner, an RFID tag reader, a magnetic stripe (e.g. credit card) reader, and a biometric reader/scanner (e.g. a fingerprint reader or a retina scanner). In some embodiments, an optical scanner is optimized to scan bar codes. In some embodiments, an optical scanner is enabled to scan printed text.

In some embodiments, an MMRS has a computing device enabled to communicate via a network, and adapted to communicate wirelessly with another unit of the MMRS, such as a wrist unit or a ring unit. In various embodiments, the communication in a wireless fashion is via a radio communication protocol, such as 802.11 or Bluetooth. In some embodiments, the communication in a wireless fashion is via infrared signaling. In various embodiments, software running on the computing device is enabled to process input from other units of the MMRS. For example, in some embodiments, the computing device is enabled to process user input applied at a unit of the MMRS, such as manual operation of switches on a ring unit. In another example, in various embodiments, the computing device is enabled to process input gathered by a unit of the MMRS, such as a data stream of an optical scan performed by an optical scanner of a ring unit, or a tag value obtained by an RFID tag reader of a ring unit. In yet another example, in some embodiments, the computing device is enabled to provide information for improved user feedback (e.g. "scan information successfully entered into database") to the MMRS.

In some embodiments, an MMRS has one or more processors. In some embodiments, one of the one or more processors is included in a wrist unit of the MMRS. In some embodiments, one of the one or more processors is included in a ring unit of the MMRS. In various embodiments, a processor in a ring unit of an MMRS enables local control of scanning and/or reading devices, such as an optical scanner or an RFID tag reader. In some embodiments, local control of scanning and/or reading devices includes interpreting results of scanning and/or reading to produce processed results, and communicating the processed results to a computing device, such as a host PC. In various embodiments, a processor in a ring unit of an MMRS enables local processing of user input, such as operation of switches of the ring unit. In some embodiments, local processing of input of switches includes debouncing of the switches. In some embodiments, local processing of user input includes interpreting the user input, and communicating the user input to a computing device, such as a host server or PC.

In some embodiments, an MMRS has a plurality of user-operable switches. In various embodiments, one or more switches are on a wrist unit. In various embodiments, one or more switches are on a ring unit. In some embodiments, a pair of user-operable switches is provided on a ring unit, such as one on each side of the ring unit. In some embodiments, each switch of the pair of switches operates independently. In some embodiments, each switch of the pair of switches is separately enabled to signal an event, such as by closing (or opening) a contact, when pressure is applied to (or removed from) the respective switch.

In some embodiments, a pair of user-operable switches is provided, one on each side of a ring unit, the pair arranged so that each of the user-operable switches is activated by pressure, such as squeezing, from fingers adjacent to a finger the ring unit is worn on. For example, in some usage scenarios where the ring unit is on a right index finger, a left user-operable switch is activated by pressure of an adjacent thumb, and a right user-operable switch is activated by pressure of an adjacent middle finger. In some usage scenarios, providing a pair of user-operable switches enables the ring unit to be used equally by both left-handed and right-handed users, without a need to physically alter, modify, or reconfigure the ring unit.

In some embodiments, a ring unit of an MMRS has a pair of user-operable switches, one on each side of the ring unit, and arranged so that the user-operable switches are activated by pressure, such as squeezing, from fingers adjacent to a finger the ring unit is worn on. In some embodiments, the ring unit is a single piece assembly with no ability for a user to mechanically re-arrange or re-configure a physical form factor of the ring unit. For example, because the switches are arranged symmetrically, one on each side of the ring unit, the ring unit is enabled for left- or right-handed use without mechanical rearrangement, reconfiguration, or alteration.

In some embodiments, a ring unit of an MMRS has a pair of user-operable switches, one on each side of the ring unit, with the switches formed as paddles. Each paddle acts as one side of a respective L-shaped rocker bar mechanism, with the respective paddle having a respective nominal (sans pressure) position, wherein pressure on the respective paddle pivots the respective rocker bar around a central point. The pivoting causes another side of the respective rocker bar to contact and to depress a respective membrane switch mounted on a flexible PCB, and further causes the respective membrane switch to register a respective transition. In some embodiments, releasing pressure on one of the paddles causes the respective membrane switch to return to a non-depressed state. The return of the respective membrane switch exerts a restorative force on the respective L-shaped rocker bar that returns the one of the paddles to the respective nominal position. In some embodiments, the paddle is affixed to the L-shaped rocker bar mechanism. In other embodiments, the paddle forms one side of the L-shaped rocker bar mechanism.

In some embodiments, a ring unit of an MMRS has a pair of user-operable switches, and the switches specify a two-bit, binary code. Each bit of the code is determined from an on-off (active/inactive) state of a respective one of the pair of switches. The code specifies up to four distinct operating modes of the ring unit. For example, if neither switch is depressed, a first mode is indicated; if only a left switch is depressed, a second mode is indicated; if only a right switch is depressed, a third mode is indicated; and if both switches are depressed, a fourth mode is indicated. In some usage scenarios, the modes correspond to operating modes of the ring unit, such as off (no scanning/reading active), optical scan active, RFID tag read active, and both optical scan and RFID tag read active. Other operating modes contemplated include wait for a first user action, respond to the first user action, wait for a second user action, and respond to the second user action. In some usage scenarios the first user action corresponds to a request for illumination (such as to assist the user in aiming) and the second user action corresponds to a request for scan initiation. In some embodiments, information about mode selection is communicated from the MMRS to a computing device via a wireless communications mechanism. For example, in some usage scenarios, the modes correspond to ways of using information obtained via the ring unit, such as off (no scanning active), scan/read to verify inventory, scan/read to add inventory, and scan/read to delete inventory. For another example, in some usage scenarios, the modes correspond to operation in a scanning system with optional improved user feedback (via interaction with a host processor), such as scan with improved user feedback and scan without improved user feedback.

In some embodiments, a ring unit of an MMRS has a pair of user-operable switches, and the switches specify a plurality of codes. In some usage scenarios, depending upon a sequence and a simultaneity of depressing the switches, different codes are signaled. For example: if neither switch is depressed, a first code is indicated; if only a left switch is depressed, a second code is indicated; if only a right switch is depressed, a third code is indicated; if both switches are simultaneously depressed, a fourth code is indicated; if the right switch is depressed followed by the left switch, a fifth code is indicated; and if the left switch is depressed followed by the right switch, a sixth code is indicated. In various embodiments, other ways of using the switches, such as tapping the switches, or holding the switches for long or for short durations, or other combinations and sequences, specify different codes.

In some embodiments, a code specified by the user-operable switches is used, at least in part, to determine an operating mode of the MMRS. In some embodiments, a code specified by the user-operable switches is communicated wirelessly to a computing device, such as a host PC, for further processing and/or interpretation.

In some embodiments, at least some of the codes are directly processed by control circuitry in the ring unit. In some embodiments, at least some of the codes are communicated from the ring unit to a wrist unit and are processed at the wrist unit. In some embodiments, at least some of the codes are communicated from the MMRS to a computing device via a wireless communications mechanism, and are processed at the computing device. In some embodiments, where or how a code is processed is dependent on a value of the code. For example, if the code is a first value, then the code is directly processed by control circuitry in the ring unit. If the code is a second value, then the code is communicated from the ring unit to a wrist unit and processed at the wrist unit. If the code is a third value, then the code is communicated from the MMRS to a computing device via a wireless communications mechanism, and processed at the computing device.

In various embodiments, functions are associated with at least some of the codes, and the associations between the functions and the at least some of the codes are changeable by a computing device coupled to the MMRS via a wireless communications mechanism. For example, initially a first function is performed when a left switch is depressed, and a second function is performed when a right switch is depressed. Upon application of a change by a computing device coupled to the MMRS via a wireless communications mechanism, the second function is performed when the left switch is depressed, and the first function is performed when the right switch is depressed. In some embodiments, the computing device assigns, reassigns, or modifies one or more functions associated with or specified by the switches based on user input at the computing device (e.g. via a keyboard, mouse, or other user interface mechanism). In some embodiments, the computing device changes which of one or more functions are performed when the switches are activated, and the changes are based on the codes communicated by the scanner to the computing device. In some embodiments, the changes are dynamically made during otherwise normal operation. In some embodiments, the changes are restricted to occur only during operation in one or more configuration contexts.

In some embodiments, an MMRS has a user-output mechanism. In various embodiments, all or any portion of the user-output mechanism is on a ring unit, a wrist unit, or both. In various embodiments, the user-output mechanism is a display unit adapted for wearing, such as in the form of a pair of glasses. In various embodiments, the user-output mechanism has any combination of one or more LEDs or lights, a speaker (e.g. for generating audio output), an LCD display, and a projection display. In some usage scenarios, the user-output mechanism signals information to a user of the MMRS in response to operation of the MMRS. For example, in some embodiments, a current operating mode (or change thereof) of the MMRS is signaled via the user-output mechanism. In some embodiments, a successful scan is signaled via the user-output mechanism. In some embodiments, a computing device coupled to the MMRS via a wireless communications mechanism is enabled, at least in part, to signal via the user-output mechanism.

In some embodiments, one or more interactions between the user, the scanner, and a computing device, are managed via a scanning system that includes an MMRS embodied, for example, as a cordless scanner device, according to any of the foregoing embodiments. A first embodiment of a cordless scanner device for use in conjunction with at least one wireless enabled host processor, the first embodiment including: a scan engine, a wireless interface for coupling the scan engine to the wireless enabled host processor; at least one scan status indicator; user feedback logic coupled to the wireless interface and the at least one scan status indicator; a housing at least partially containing the scan engine, the wireless interface, the at least one scan state indicator, and the user feedback logic; and wherein the user feedback logic selectively changes the state of the at least one scan status indicator based upon scan confirmation status sent by the host processor. The preceding embodiment, wherein the scan confirmation status indicates whether or not the host processor successfully received scan data from the scan engine.

A second embodiment, including all of the aspects of the first embodiment, wherein the scan confirmation status is sent embedded in a command stream sent from the host processor to the scan engine. The second embodiment, wherein the scan confirmation status is sent as an extended SSI command. The second embodiment, wherein the user feedback logic captures the embedded scan confirmation status and implements the change in the at least one scan status indicator in accordance with the captured scan confirmation status. The preceding embodiment, wherein the at least one scan status indicator includes a green light. The preceding embodiment, wherein the green light does not illuminate until the host processor indicates that it has successfully received a scan. The preceding embodiment, wherein the green light is implemented using LED technology.

A third embodiment, including all of the aspects of either the first or the second embodiments, wherein the scan engine uses optics based scanning. The third embodiment, wherein the scan engine is for scanning bar codes. The third embodiment, wherein the scan engine includes a laser scanner. The third embodiment, wherein the scan engine includes a 1D CCD array. The third embodiment, wherein the scan engine includes a 2D CCD imager.

A fourth embodiment, including all of the aspects of either the first or the second embodiments, wherein the scan engine uses RF based scanning. The fourth embodiment, wherein the scan engine is for scanning RFID tags. The fourth embodiment, wherein the scan engine uses inductive coupling techniques. The fourth embodiment, wherein the scan engine uses perturbated reflected RF energy techniques. The fourth embodiment, wherein the scan engine uses microwave backscatter techniques. The fourth embodiment, wherein the scan engine is enabled to read a magnetic stripe. The foregoing embodiment, wherein the magnetic stripe is part of a credit card.

A fifth embodiment, including all of the aspects of any of the first through the fourth embodiments, wherein the wireless interface of the wireless scanner is compatible with an industry standard for personal area wireless networking. The forgoing embodiment wherein the industry standard is compatible with the Bluetooth standard. A sixth embodiment, including all of the aspects of any of the first through the fourth embodiments, wherein the wireless interface of the wireless scanner is compatible with an industry standard for local area wireless networking. The forgoing embodiment wherein the industry standard is compatible with the WiFi standard. A seventh embodiment, including all of the aspects of any of the first through the fourth embodiments, wherein the wireless interface of the wireless scanner is infrared.

An eighth embodiment, including all of the aspects of the first embodiment, wherein the scan status indicators transition between states that include: standby for host confirmation and good scan at host. The preceding embodiment, wherein the states further include: waiting on user, and bad scan at host.

A ninth embodiment, including all of the aspects of the first embodiment, wherein the scan engine performs a scan only when the wireless link between the scan engine and the host processor is working.

A tenth embodiment of a method for accuracy-enhanced scanning, the tenth embodiment including: in response to a first user input, illuminating one of a plurality of potential scan targets with a scanner; and in response to a second user input, scanning a particular one of the potential scan targets with the scanner. The preceding embodiment, further including a user providing the first and the second user inputs. The preceding embodiment, further including the user, in between providing the first and the second user inputs, aiming the scanner at the particular scan target.

An eleventh embodiment of an accuracy-enhanced scanner, the eleventh embodiment including: means for illuminating one of a plurality of potential scan targets; means for scanning a selected scan target; a housing at least partially enclosing the means for illuminating and the means for scanning, the housing being compatible with operation by a user with a single hand; and wherein the means for illuminating and the means for scanning are arranged such that when the user aims the scanner so that illumination provided by the means for illuminating illuminates the selected scan target, the scanner is aimed to enable the means for scanning to scan the selected scan target.

Multi-Mode Ring Scanner

Figure 10:
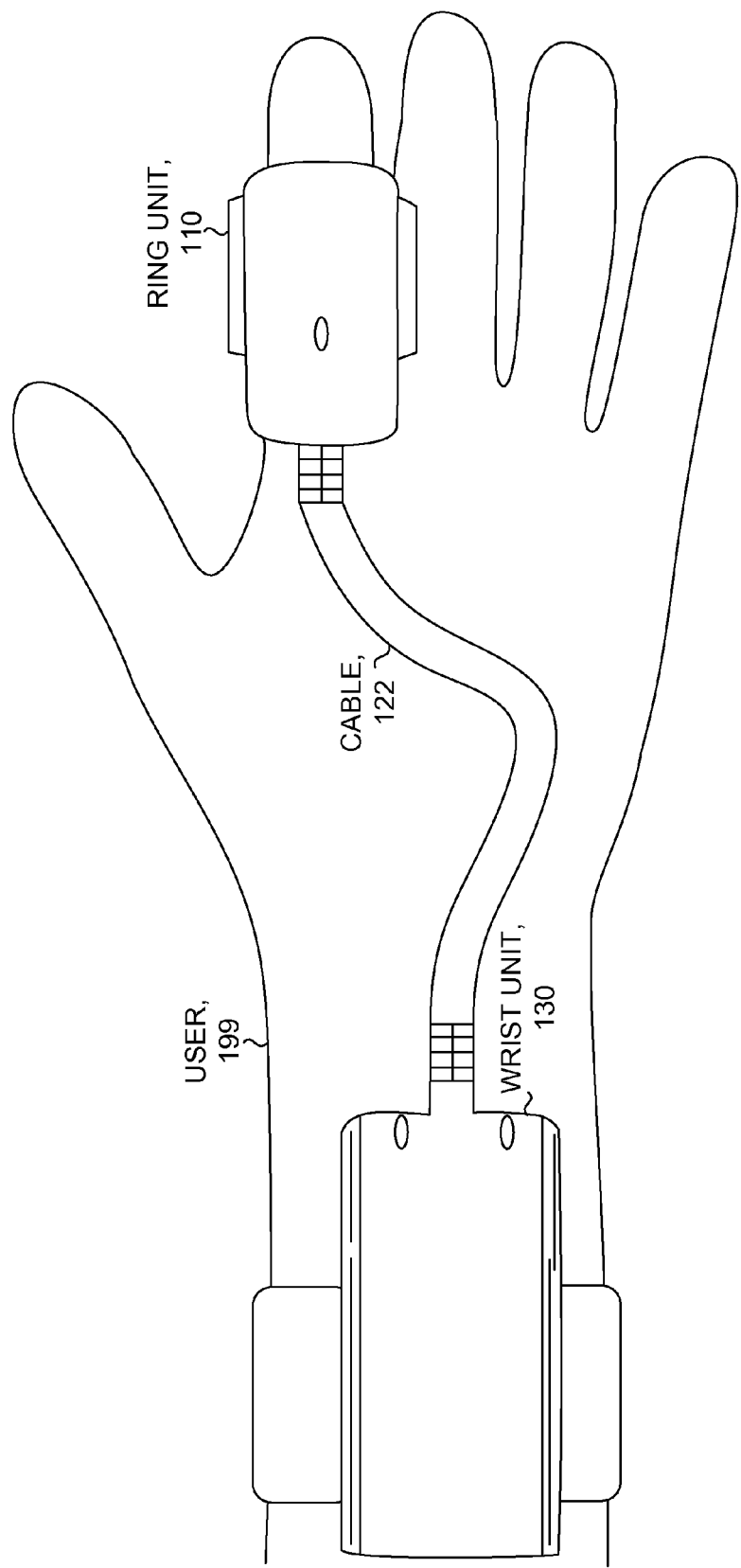
FIG. 10 illustrates selected details of an example deployment of an MMRS (with applicability to an accuracy-enhanced MMRS embodiment), showing the MMRS worn by a user.

FIG. 1 illustrates selected details of an embodiment of a ring unit of an MMRS (with applicability to an accuracy-enhanced MMRS embodiment), showing a three-dimensional view of the top, the front, and the left side. FIG. 1 illustrates ring unit 110. In some embodiments, ring unit 110 includes a coupling for cable 122, enabling ring unit 110 to couple with a wrist unit, such as wrist unit 130, as shown in FIG. 10. In other embodiments, ring unit 110 operates without cable 122 and connects wirelessly to a wrist unit, or connects wirelessly directly to a network and/or to a computing device. The wireless connectivity is provided, for example, via inclusion of one or more of a Bluetooth transceiver, an 802.11 wireless transceiver, a ZigBee transceiver, a UWB transceiver, a WLAN or WPAN transceiver, or an infrared transceiver.

FIGS. 2 to 7 illustrate selected details of an embodiment of a ring unit of an MMRS (with applicability to an accuracy-enhanced MMRS embodiment), showing differing views. FIGS. 2 and 6 are side views. FIG. 3 is a back view. FIG. 4 is a top view. FIG. 5 is a front view. FIG. 7 is a bottom view.

FIGS. 3 and 5 also illustrate strap 190. Strap 190 provides a way to secure ring unit 110 to a finger of a user, such as user 199, as shown in FIG. 10. In some embodiments, strap 190 is an adjustable strap. In some embodiments, strap 190 is fabric hook-and-loop fastener (such as a Velcro strap).

Example Deployments

FIG. 10 illustrates selected details of an example deployment of an MMRS (with applicability to an accuracy-enhanced MMRS embodiment), showing the MMRS worn by a user. In some embodiments, ring unit 110 and wrist unit 130 are coupled via cable 122. As shown in the example of FIG. 10, both ring unit 110 and wrist unit 130 are deployed on a finger and on a wrist, respectively, of user 199. In some embodiments, not shown in FIG. 10, functionality of the wrist unit is subsumed into the ring unit, and the wrist unit and the cable are not present.

In some embodiments, cable 122 is a stretchable cable. The stretchable cable is adapted to permit a full range of movement of the hand and wrist. At the same time, the stretchable cable is adapted to minimize or eliminate the "loop" (the gap between the hand and the cable) that would otherwise be formed with a non-stretchable cable, by reducing excess cable length when the hand and wrist are in some configurations. In various usage scenarios, minimizing or eliminating the loop (or reducing the slack in the cable) improves visual appeal, reduces chances of catching the loop on (or by) adjacent objects, or both. In various embodiments, the stretch cable is a flat cable, a ribbon cable, or a coiled cable. The stretch cable length is such that a slight tension is maintained between the wrist unit and the ring unit when the wrist unit and the ring unit are in closest proximity to each other during use.

Figure 11A:
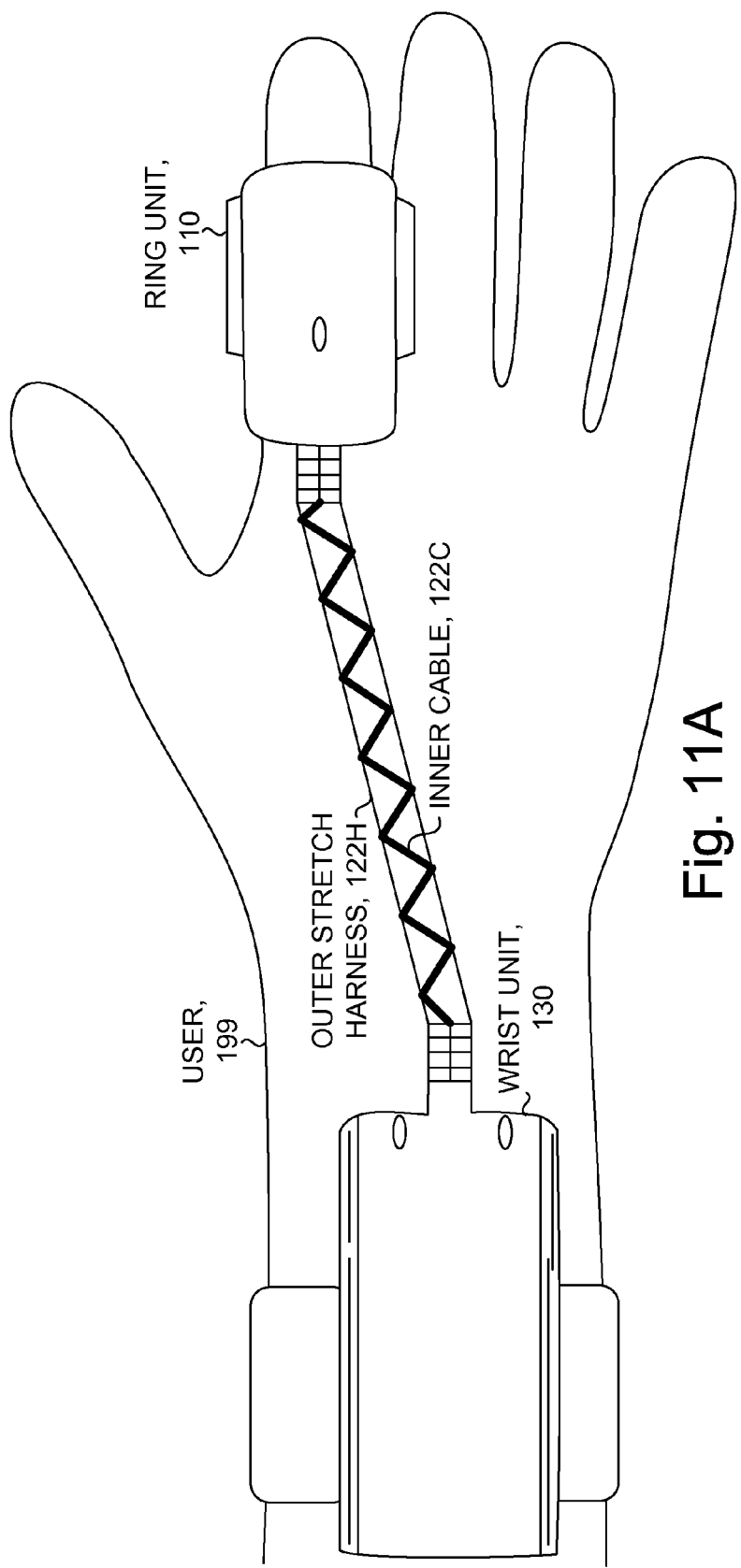
FIGS. 11A and 11C illustrate selected details of other examples of deployments of an MMRS (with applicability to an accuracy-enhanced MMRS embodiment), showing from a top view selected details of embodiments of a stretch cable used to couple a ring unit and a wrist unit.
Figure 11B:
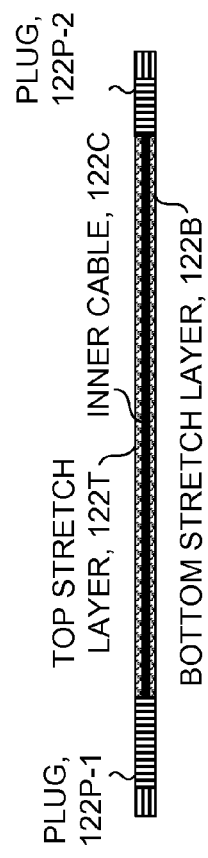
FIGS. 11B and 11D illustrate, respectively, selected details of the stretch cables of FIGS. 11A and 11C from a side view.
Figure 11C:
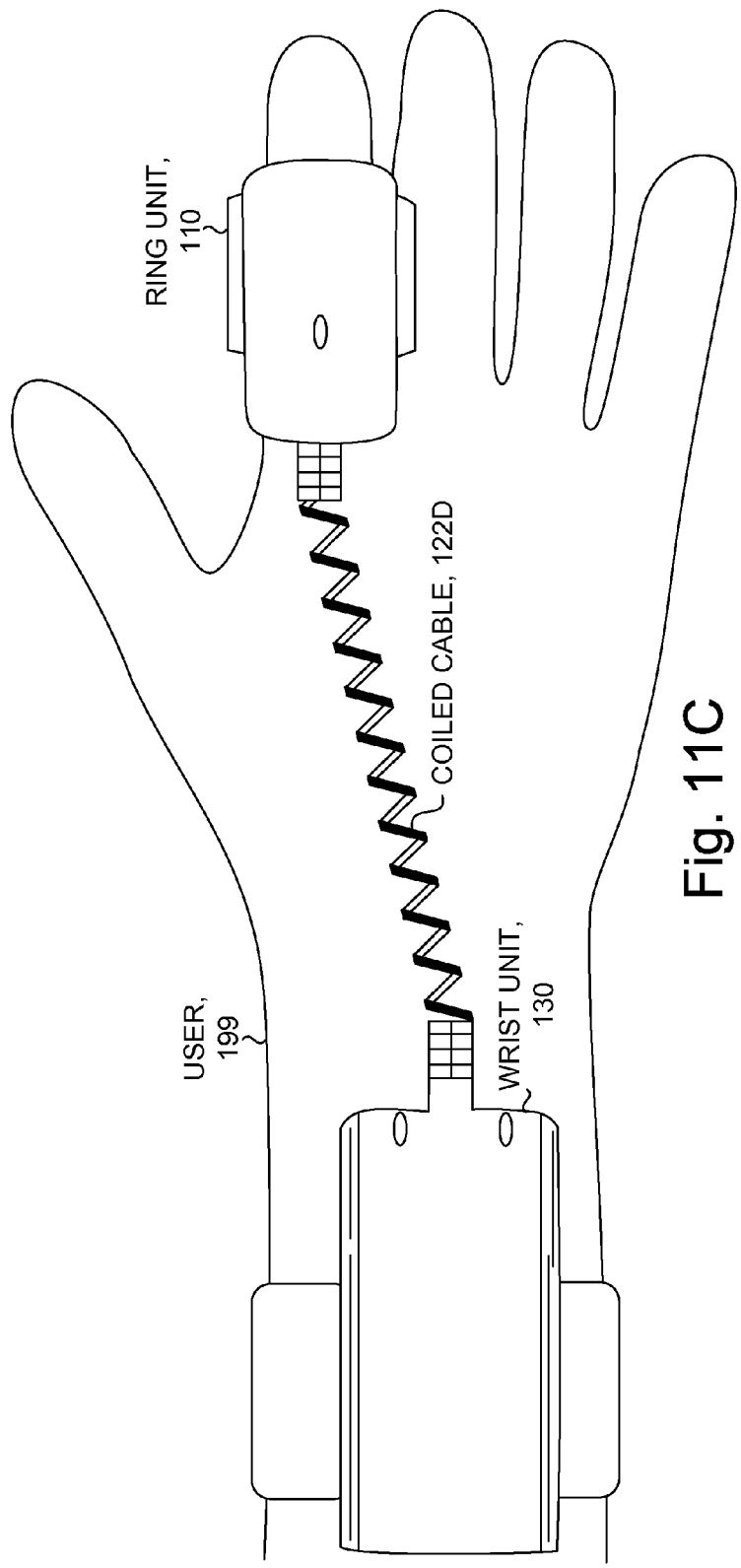
Figure 11D:
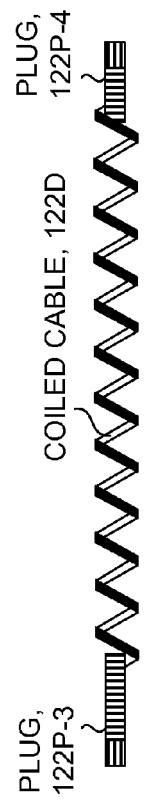

FIG. 11A illustrates selected details of another example deployment of an MMRS (with applicability to an accuracy-enhanced MMRS embodiment), showing from a top view the use of a stretch ribbon cable to couple ring unit 110 and wrist unit 130. As shown, the stretch cable has an outer stretch harness 122H holding an inner cable 122C. In various embodiments, the inner cable 122C is arranged in a serpentine, z-fold (illustrated), or other configuration. In some embodiments, the inner cable is captured between two layers of stretch material (such as elastic fabric). In various embodiments, the layers are held together by glue, epoxy, stitching, or other fastening. FIG. 11B illustrates selected details of stretch ribbon cable 122C of FIG. 11A from a side view. The stretch ribbon cable includes plug 122P-1 for mating with wrist unit 130 and plug 122P-2 for mating with ring unit 110. The inner cable 122C is held between a top stretch layer 122T and a bottom stretch layer 122B. FIG. 11C illustrates selected details of another example deployment of an MMRS (with applicability to an accuracy-enhanced MMRS embodiment), showing from a top view the use of a stretch coiled cable 122D coupling ring unit 110 and wrist unit 130. FIG. 11D illustrates selected details of stretch coiled cable 122D of FIG. 11C from a side view. The stretch coiled cable includes plug 122P-3 for mating with wrist unit 130 and plug 122P-4 for mating with ring unit 110.

Multiple Input Devices

Figure 8A:
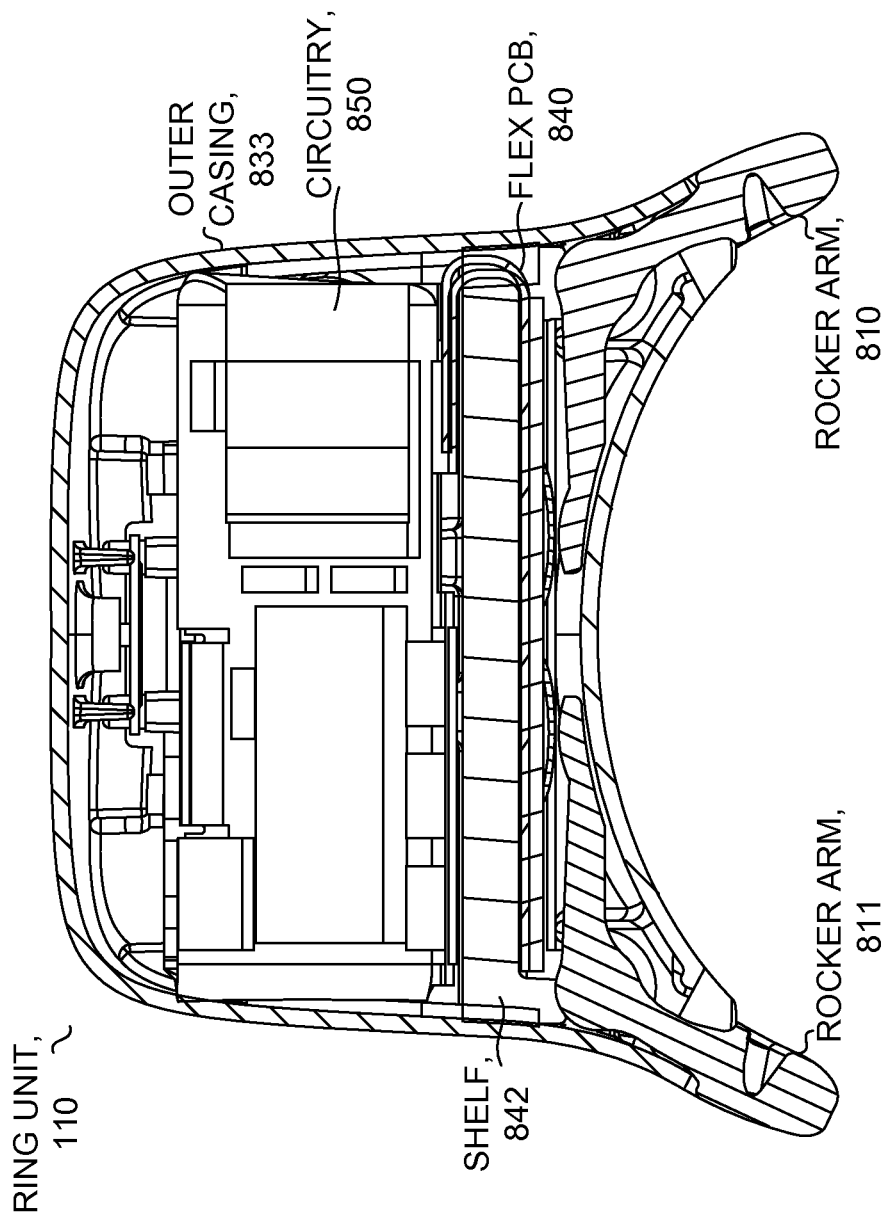
FIG. 8A illustrates selected details of an embodiment of a ring unit of an MMRS (with applicability to an accuracy-enhanced MMRS embodiment), showing a cross-sectional view of a vertical slice as seen from the front.

FIG. 8A illustrates selected details of an embodiment of a ring unit of an MMRS (with applicability to an accuracy-enhanced MMRS embodiment), showing a cross-sectional view of a vertical slice as seen from the front. Ring unit 110, as shown in FIG. 8A, has circuitry 850 and flexible PCB 840 enclosed by outer casing 833. In some embodiments, flexible PCB 840 is wrapped around shelf 842, providing mechanical support for both a top portion and a bottom portion of the flexible PCB. Circuitry 850 includes, in various embodiments, scanning and/or reading devices (such as optical scanners, RFID tag readers, magnetic stripe readers, and biometric readers/scanners). In some embodiments, circuitry 850 has one or more communications mechanisms, such as an interface to cable 122 or a Bluetooth transceiver. In some embodiments, circuitry 850 further has control circuitry, such as a local processor. In some embodiments, the local processor has associated memories, such as flash memory and/or static random access memory. In some embodiments, a portion of circuitry 850 is mounted on flexible PCB 840. In some embodiments, a portion of circuitry 850 is mounted on shelf 842.

Ring unit 110 further has rocker arms 810 and 811. The rocker arms are designed so that inward pressure (towards a central axis of the ring unit), applied by a wearer of the ring unit, causes the rocker arms to pivot and an end of the rocker arms to contact a switch on flexible PCB 840. This is shown in more detail in FIG. 8B.

Figure 8B:
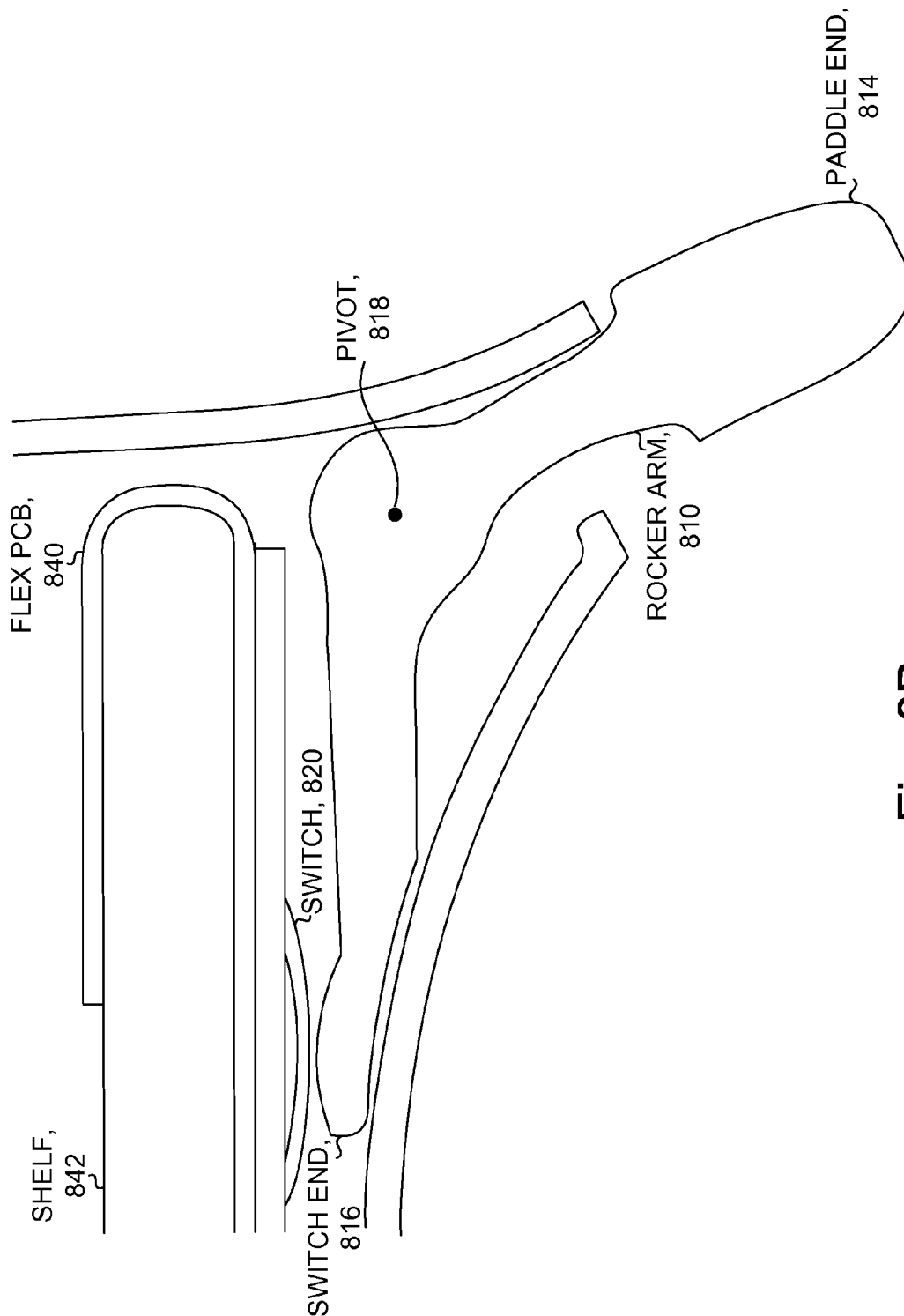
FIG. 8B illustrates selected details of an embodiment of a ring unit of an MMRS (with applicability to an accuracy-enhanced MMRS embodiment), showing an enlargement of a portion of FIG. 8A.

FIG. 8B illustrates selected details of an embodiment of a ring unit of an MMRS (with applicability to an accuracy-enhanced MMRS embodiment), showing an enlargement of a portion of FIG. 8A. FIG. 8B illustrates rocker arm 810, showing how the rocker arm is enabled to activate a switch. Rocker arm 810 has a nominal position (when no inward pressure is applied to the rocker arm). Inward pressure on paddle end 814 pivots the rocker arm around pivot point 818, causing switch end 816 to elevate and to depress switch 820 mounted on flexible PCB 840. In some embodiments, switch 820 is a membrane switch. In some embodiments, removal of pressure on paddle end 814 causes membrane switch 820 to exert pressure on switch end 816, returning rocker arm 810 to the nominal (no inward pressure) position. In some embodiments, flexible PCB 840 is wrapped around shelf 842, providing mechanical support for both a top portion and a bottom portion of the flexible PCB, the bottom portion having switch 820.

Attachment of Input Devices

Figure 9B:
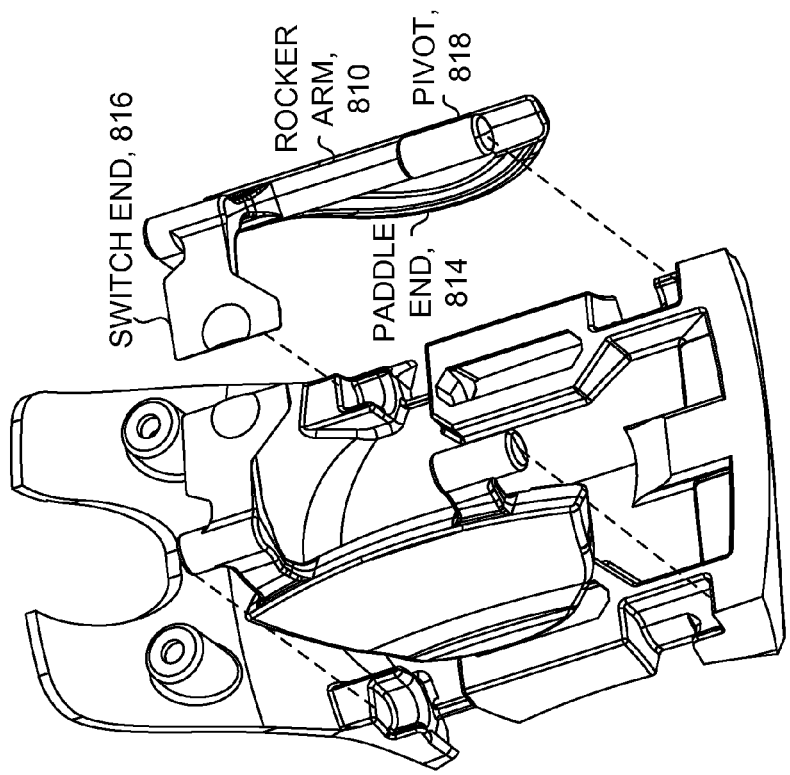
FIGS. 9A and 9B illustrate selected details of an embodiment of a ring unit of an MMRS (with applicability to an accuracy-enhanced MMRS embodiment), showing a cutaway view from the top.
Figure 9A:
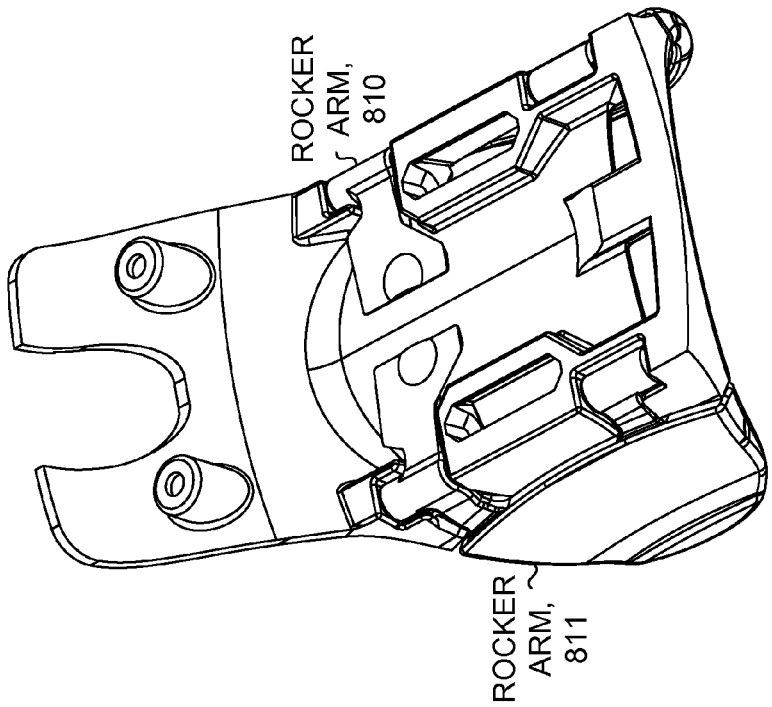

FIGS. 9A and 9B illustrate selected details of an embodiment of a ring unit of an MMRS (with applicability to an accuracy-enhanced MMRS embodiment), showing a cut-away view from the top. In FIGS. 9A and 9B, the upper portion of the ring unit (circuitry 850, flexible PCB 840, shelf 842, and outer casing 833 as shown in FIG. 8A) are not illustrated to show a view of rocker arms 810 and 811, and a manner of attachment and operation.

As illustrated by FIGS. 9A and 9B, rocker arms 810 and 811 have a paddle end, such as paddle end 814 of rocker arm 810, and a switch end, such as switch end 816 of rocker arm 810. The rocker arms have one or more pivot points, such as pivot point 818 of rocker arm 810, enabling the rocker arm to rotate so that in response to inward pressure on the paddle end, the switch end elevates, causing the switch end to contact a switch, such as a membrane switch, on a flexible PCB (not shown in FIGS. 9A and 9B).

As shown in FIGS. 9A and 9B, rocker arms 810 and 811 are independent, and operate freely and without interfering with each other. This permits user operation of the paddles, and thereby the switches they depress, to occur in a wide range of combinations and sequences.

Multi-Mode Operation

One or more processors included in a wrist unit, a ring unit, or both of an MMRS, enable local processing functions, such as local control of scanning and/or reading devices, interpretation and implementation of actions relating to switches of the ring unit, and communication of information between the units of the MMRS or between a host server or PC. Activations (and deactivations) of the switches are optionally processed to change an operating mode (from among a plurality of operating modes) of the MMRS, to signal an event, or to specify a code to communicate to the host.

For example, an embodiment of an MMRS includes a pair of switches, and a first mode is entered when a first one of the two switches is activated, a second mode is entered when a second one of the two switches is activated, a third mode is entered when both of the two switches are activated, and a fourth mode is entered when neither of the two switches are activated. Exemplary modes include no scanning/reading active, optical scan active, RFID tag read active, and both optical scan and RFID tag read active. Further exemplary modes relate to ways of using information from the MMRS, such as off (no scanning active), scan/read to verify inventory, scan/read to add inventory, and scan/read to delete inventory. The modes relating to ways of using the information are optionally communicated to the host. Further exemplary modes correspond to operation with and without improved user feedback (such as from the host). For another example, any of four distinct events or codes is signaled by activation/deactivation of the pair of switches (first on and second off, first off and second on, first and second on, and both off). Further exemplary modes relate to enhanced-accuracy operation (such as a scanner providing illumination for a user to adjust aiming of the scanner toward a target). For example, a first mode corresponds to waiting for a first user action, a second mode to responding to the first user action (a request for illumination), a third mode to waiting for a second user action, and a fourth mode to responding to the second user action (a request for a scan initiation).

The processing of the activations (and the deactivations) is, in various embodiments, performed on any combination of the processors included in the MMRS and the processing resources of the host. In some embodiments, processing relating to various activations/deactivations is performed selectively dependent on the particular activation/deactivation. As an example, activation of a first switch specifies turning on a scanner of the ring unit, and activation of a second switch specifies toggling between inventory add and inventory deletion operation. Activation of the first switch is processed by the processors included in the MMRS and activation of the second switch is processed by the processing resources of the host.

Operation of the MMRS is alterable, in some embodiments, by the host. For example, initially, first and second modes are entered, respectively, when respective ones of the switches are pressed. Subsequently, the host directs the MMRS to operate such that third and fourth modes are entered, respectively, when respective ones of the switches are pressed.

Modes, events, and/or codes are specified, in various embodiments, according to "static" and "dynamic" activation/deactivation of the switches of the MMRS. An example of static activation (deactivation) is turning a switch on (or leaving a switch off) for a relatively long period of time. Examples of dynamic activation (deactivation) are tapping a single switch, or tapping different switches in sequence.

Wireless Scanner System

Figure 12:
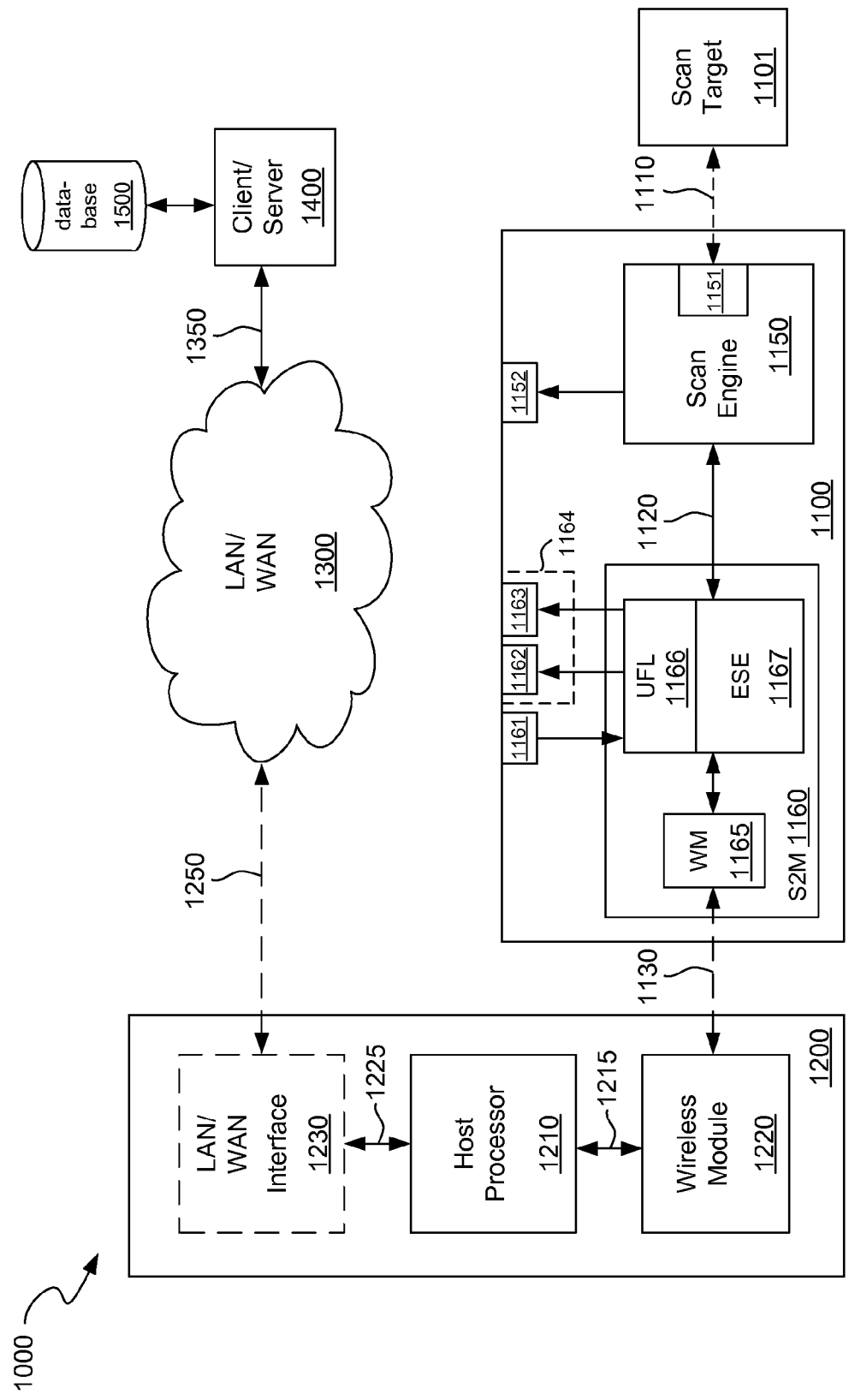
FIG. 12 illustrates a system context of an illustrative embodiment of a wireless scanner with improved user feedback (with applicability to an accuracy-enhanced MMRS embodiment).

FIG. 12 shows an illustrative embodiment of a wireless scanner 1100 with improved user feedback in the context of system 1000. In system 1000, scan target 1101 is scanned by scanner 1100 via scan process 1110. Scan process 1110 may take a variety of forms, such as passive and active optical and RF techniques for scanning printed codes and RFID tags.

Scanner 1100 includes scan engine 1150 (including scan transducer 1151 and audible indicator 1152) coupled via 1120 to Scanner-to-Host (S2H) interface module (S2M) 1160, control 1161, visual indicator group 1164 (including amber light 1162 and green light 1163). According to various embodiments, visual scan indicator group 1164 includes one or more lights (such as a green LED of an MMRS). Scanner-to-Host (S2H) interface module (S2M) 1160 includes wireless module (WM) 1165, User Feedback Logic (UFL) 1166 and Extended SSI Engine (ESE) 1167. In an illustrative embodiment, coupling 1120 is logically compatible with an RS-232 link. According to various embodiments, all or any portions of scanner 1100 are included in any combination of a wrist unit, a cable, and a ring unit (such as wrist unit 130, cable 122, and ring unit 110 of FIG. 10).

Scanner 1100 communicates scan data to host 1200 via wireless connection 1130. Wireless connection 1130 may take a variety of forms, such as PAN technology (e.g., Bluetooth or ZigBee), LAN technology (e.g., WiFi), or optical technology (e.g., infrared). In illustrative embodiments, for some applications where host 1200 is a PDA, tablet PC, or phone (e.g. mobile or cell), Bluetooth class 2 is used, having a range of roughly 10 meters. For some applications where host 1200 is a desktop, Bluetooth class 1 is used, having a range of roughly 100 meters.

Host 1200 may take a variety of forms, such as point-of-sale terminals; desktop, laptop, and tablet PCs; PDAs; and mobile/cell phones. Host 1200 includes host processor 1210 coupled via link 1215 to wireless module 1220 and optionally via interconnect 1225 to optional LAN/WAN interface 1230. In an illustrative embodiment, link 1215 is connected to a standard com (serial communications) port of the host processor. Host 1200 includes an operating system (such as Symbian, Palm, Microsoft, Linux, or embedded variations of the foregoing, depending on the platform) and device drivers for scanner 1100.

Link 1215 is, in various embodiments, compatible with USB, PCI, SD, and ExpressCard bus signaling and/or protocols. Link 1215 uses, in various embodiments, a protocol that is compatible with transport provided by link 1130. For example, in some embodiments where the host is a PDA or phone, link 1215 uses a protocol compatible with the industry standard H4 serial protocol to communicate the SSI data between the host processor and the scanner. For another example, in some embodiments where the host is a desktop, laptop, or tablet PC, a protocol compatible with the industry standard USB protocol is used.

Host 1200 optionally communicates over network LAN/WAN 1300 to client/server 1400 (via host-to-network link 1250 and client/server-to-network link 1350). LAN/WAN 1300 may take a variety of forms such as a LAN, a larger departmental network, an intranet, and the Internet. Links 1250 and 1350 may take a variety of forms such as Ethernet, WiFi, RS-232, dial-up modem, and mobile/cell phone technologies. Wireless links employ antennas, perhaps embedded within their associated devices, perhaps at least partially external, none of which are explicitly shown, but are understood to be present to those of ordinary skill in the art.

Client/server 1400 generally has an associated database 1500 that may be queried or updated in response to the scan of scan target 1101. Alternatively, such a database may in whole or in part reside on host 1200 and be queried or updated locally, and the LAN/WAN connection may be established periodically to synchronize local and remote copies of the database.

The scan data is transferred over the links using various degrees of encoding and encapsulation. Scan engine 1150 communicates using the industry SSI protocol, that encapsulates ASCII data corresponding to scanned code. Example off-the-shelf SSI modules suitable for use as scan engine 1150 are the SE4400, 923, 824, and Positron modules, all by Symbol Technologies. Other modules are suitable for use as the scan engine, such as the Intermec EA15. In some embodiments, ESE 1167 and host processor 1210 communicate using an extension of the SSI protocol, described below. The extended SSI protocol is bridged onto wireless link 1130. The device drivers within host 1200 (for use with scanner 1100), and the firmware within ESE 1167, are enabled to use the extended SSI protocol.

In an illustrative embodiment, data received by ESE 1167 from host processor 1210 over wireless link 1130 is generally resent over RS-232 link 1120 as a command to scan engine 1150 using an RTS/CTS control handshake. Data received by ESE 1167 from scan engine 1150 over RS-232 link 1120 is generally resent to host processor 1210 using the flow control protocol of wireless link 1130.

To enable host processor 1210 to send messages to scanner 1100 over wireless link 1130, a current SSI command from the "HOST" to the scan engine has been lengthened. In an illustrative embodiment, the command selected is the SSI command CMD_NAK, which has the Opcode 0xD1 and a minimum length of 6 bytes.

As illustrated in the following table, an SSI Sub Command of CMD_NAK is defined with a payload that includes an indication that the host processor did (ACK), or did not (FAIL), receive a good scan. How these indications are used is detailed in conjunction with examination of FIG. 13, discussed next. Other embodiments use other techniques for extending the SSI command set, or use a custom command set, to equivalently provide the scanner with the host scan confirmation.

TABLE 1

Host Scan Confirmation Status (Extended SSI Command)

| Field Name | Format | Size | Description |
| --- | --- | --- | --- |
| Length | 0x07 | 1 Byte | Length of packet (excludes CS) |
| Opcode | 0xD1 | 1 Byte | SSI Opcode (always 0xD1) |
| Message Source | 0x04 (Host) | 1 Byte | Identifies where the message is coming from. |
| Status | Bit 0: Retransmit Bit 1-7: unused | 1 Byte | Identifies the transmission status. Unused bits must be set to 0. |
| Sub Command | 0x0008 | 2 Bytes | Host Scan Confirmation Status |
| Payload | | 1 Byte | Scan Confirmation Status: 0x00 = bad scan (FAIL) 0x01 = scan received OK (ACK) |
| Checksum | | 2 Bytes | Checksum of message. |

Wireless Scanner User Feedback

Figure 13:
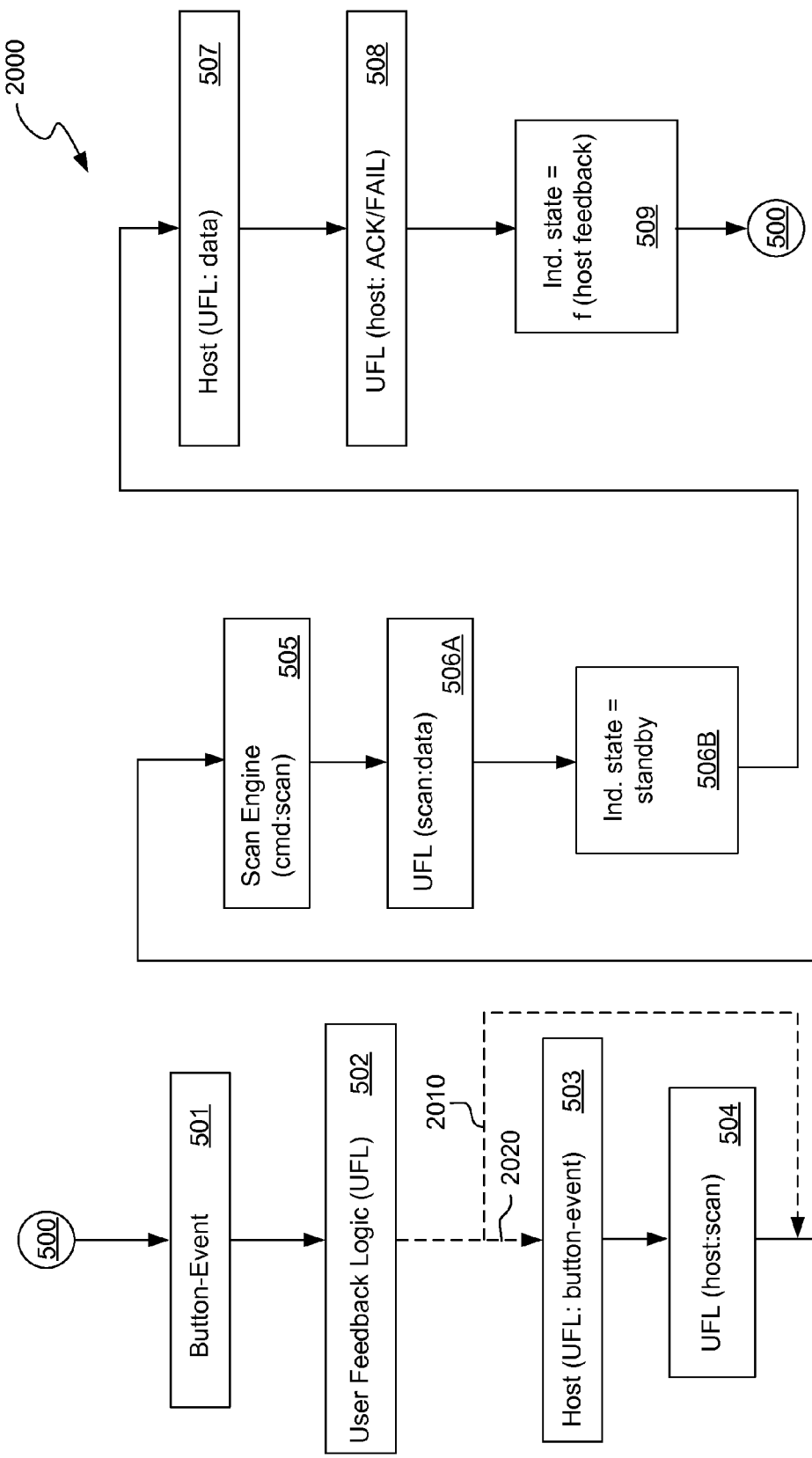
FIG. 13 is a flow diagram illustrating an embodiment of improved user feedback in a wireless scanner (with applicability to an accuracy-enhanced MMRS embodiment).

FIG. 13 is a flow diagram conceptually illustrating improved user feedback in a wireless scanner (with applicability to an accuracy-enhanced MMRS embodiment). Multiple embodiments are illustrated by the figure, corresponding to dashed paths 2010 and 2020.

Flow begins conceptually at operation 500, corresponding to waiting for a new scan to be user initiated. Button-event, operation 501, corresponds to the user initiating a scan by pressing scan button 1161. The button-event is then noted by User-Feedback Logic (UFL) 1166 in operation 502. According to various embodiments, scan button 1161 corresponds to either of two switches, such as activated by rocker arms 810 or 811 of FIG. 8A, e.g. by squeezing or pressing respective paddles. In various embodiments, an activation of scan button 1161 corresponds to specification of one or more of a plurality of codes via operation of the paddles or a sequence of operations of the paddles. In one example, activation of the scan button corresponds to squeezing a left (or right) paddle that depresses a left (or right) switch. In another example, activation of the scan button corresponds to squeezing the left paddle followed by squeezing the right paddle, thus depressing the left switch followed by depressing the right switch.

From operation 502, flow continues down one of path 2010 or 2020. In a first embodiment, corresponding to path 2020, host processor 1210 receives notice of the button-event from UFL 1166 in operation 503. UFL 1166 subsequently receives a scan initiation command from host processor 1210 in operation 504. In a second embodiment, flow follows path 2010, bypassing operations 503 and 504 (these operations are not implemented if path 2010 is followed). In both embodiments, flow continues to operation 505.

Scan engine 1150 receives the scan initiation command from UFL 1166 in operation 505, and initiates a scan. The scan engine returns scan data and status to UFL 1166 in operation 506A.

Whether to use path 2010 or 2020 is an implementation dependent choice. In some usage scenarios, path 2020 is preferable if the additional operations do not introduce a significant delay in initiating the scan. When flow includes path 2020, UFL 1166 will not proceed to operation 505 until it receives a scan command from host processor 1210. If the scan command is not received within a timeout interval, the flow returns to operation 500, without the scan engine being activated. This abnormal timeout path is not explicitly illustrated in FIG. 13. In some usage scenarios, not activating the scan engine when the wireless link is down is a benefit of using the embodiment of path 2020. Activating the scan engine (which generates scanning behavior that the user generally perceives) when the wireless link is down may confuse the user.

Reduced path delay frequently is in tension with reduced power consumption. E.g., if a Bluetooth wireless link is used for link 1130, the sleep configuration of the Bluetooth radios adjusts how often the radios are enabled within their allocated time slots, which directly impacts both battery life and latency. If the overall path latency prior to initiating the scan is too much, and reducing the latency by increasing power consumption is not an option, then in some usage scenarios, path 2010 is used.

The state of visual indicators 1164 is changed to "standby" (amber light 1162 is lit) in operation 506B, corresponding to the first opportunity that UFL 1166 has to receive scan data from the scanner. The standby indication gives visual feedback that the scan action has been completed locally and that the scanner is waiting for host confirmation (i.e. host confirmation is pending). The location of the operation setting the pending indication is not critical, although the exact definition of the standby indication necessarily may change as a result of its placement in the control flow.

In operation 507, UFL 1166 forwards the scan data and status to host processor 1210. Once host processor 1210 has determined that the scan was successful, the host processor communicates success state back to UFL 1166 (via the ACK), in operation 508. If host processor 1210 determines that the scan was not successful (based on the scan status, invalid data, or an elapsed time-out interval), then host processor 1210 optionally communicates failure state back to UFL 1166 (via the FAIL).

In operation 509, the state of visual indicators 1164 is updated as function of the host feedback. In the event of success, UFL 1166 changes the pending indication to a successful completion indication (amber light 1162 is extinguished and green light 1163 is lit). In the event of failure (either due to an explicit FAIL from the host, or due to a timeout without ACK), UFL 1166 changes the pending indication to a failure indication (e.g., by extinguishing amber light 1162 and keeping green light 1163 dark, flashing amber light 1162, or by an additional red light indicator, not explicitly shown). Optionally in operation 509, UFL 1166 also sends a command to scan engine 1150 to sound audible indicator 1152 to provide positive or negative audible feedback (e.g., a short pleasant tone for a successful scan, a long discordant buzz for a failed scan). After operation 509, the process conceptually returns to operation 500, corresponding to waiting for a new scan to be user initiated.

Thus UFL 1166 indicates transitions among four states via corresponding transitions of the lights and tones. The states (and associated example visual and audible indications) are Waiting on User (no lights), Standby for Host Confirmation (amber light), Good Scan at Host (green light, positive tone), and Bad Scan at Host (red light, negative tone).

Accuracy-Enhanced Scanning

In some embodiments and/or usage scenarios, a scanner (or scanning system) is enhanced to enable separate aiming and scanning operations. In response to a first user action, the scanner provides an aide for aiming the scanner at one of a plurality of potential scanning targets, such as targets that are in close physical proximity. In response to a second user action, the scanner scans in accordance to where the user has aimed the scanner. Separation of aiming and scanning is applicable to handheld and portable scanning usage scenarios (such as where the scanner is generally moved to scan items) and is applicable to fixed-location scanning usage scenarios (where scanned items are moved with respect to the scanner) to pre-align the scanner (such as a two-dimensional scanner) with respect to planned movement of scanned items.

For example, an accuracy enhanced gun-shaped scanner has a button located for convenient depression by a thumb of a hand holding the scanner, and the scanner further has a trigger located for convenient pulling by a finger of the hand. Depressing the button corresponds to the first user action, and pulling the trigger corresponds to the second user action. In operation, a user depresses the button, and in response the scanner provides a visual indication (e.g. an illumination) in a direction corresponding to scanning. The user moves and/or orients the scanner so that the visual indication illuminates a desired scan target, such as one of several barcodes (e.g. on a shipping container) in close physical proximity. When the user is satisfied that the orientation of the scanner is correct for proper scanning of the desired scan target, then the user pulls the trigger. In response, the scanner scans, reading information corresponding to the desired scan target.

In some embodiments and/or usage scenarios, conveniently located controls enable a user to efficiently perform the first and second actions, optionally in conjunction with efficiently aiming a scanner. For example, depression of the rocker arms of a ring unit (such as of an MMRS) enables a user to quickly request a visual indicator by pressing or squeezing one of the rocker arms, to aim the ring unit based thereon, and then to quickly request a scan by pressing or squeezing another of the rocker arms. For another example, partial depression of a switch requests a visual indicator, while full depression of the switch requests a scan. For yet another example, depression of a thumb-switch on a body of a cordless hand scanner requests a visual indicator, and pulling of a finger-switch (similar to a trigger) requests a scan. For yet another example, tapping one of a pair of soft buttons shown on a display of a PDA having a coupled add-on scanner requests a visual indicator, while tapping on the other soft button of the pair requests a scan.

Various scanners are enabled to recognize the first and second user actions via one or more of, e.g.: a switch, a mechanical switch, a rocker arm controlled (mechanical) switch, a button controlled (mechanical) switch, a touch-sensitive switch, all or a portion of a touch-sensitive panel, all or a portion of a touch-sensitive display, or a soft button provided via all or a portion of a touch- and/or pressure-sensitive panel and/or screen. The visual indication is provided as an illumination shaped as one or more of, e.g.: a line (such as oriented in a major axis corresponding to a scanning major axis), a horizontal line, a vertical line, a dot, one or more (concentric) circles, or cross-hairs.

Figure 14B:
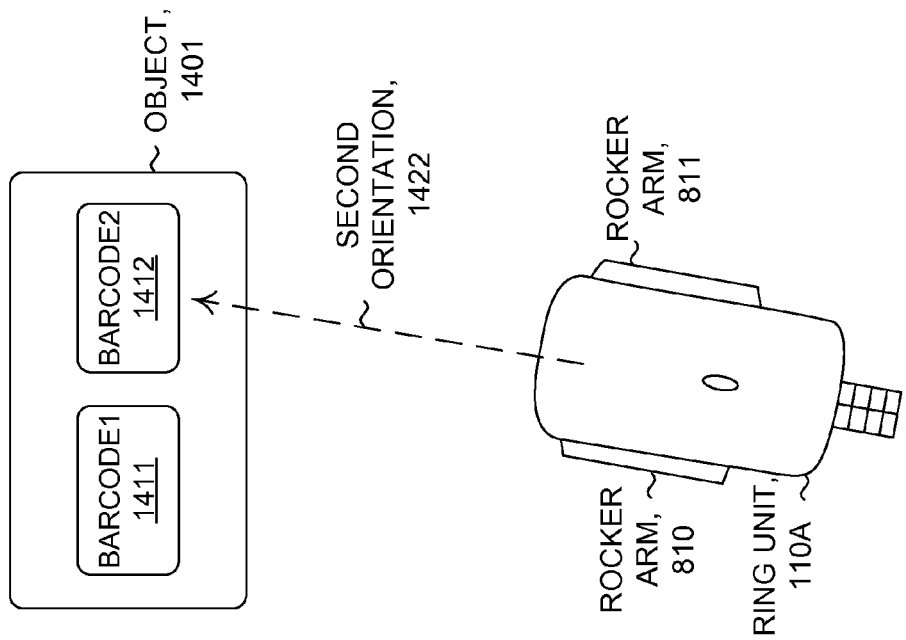
FIGS. 14A and 14B illustrate selected details of an embodiment of accuracy-enhanced scanning using an accuracy-enhanced MMRS.
Figure 14A:
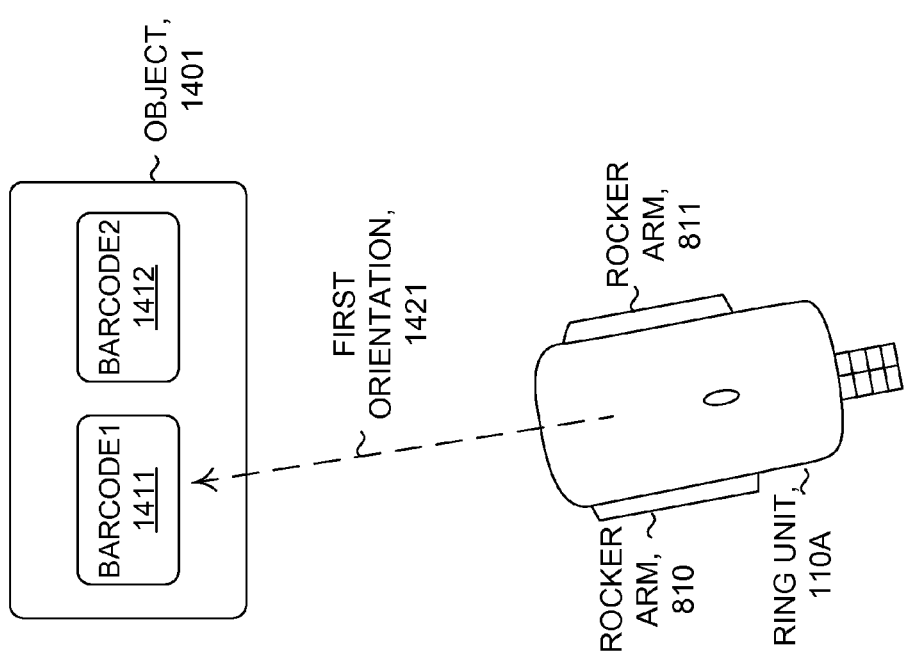

FIGS. 14A and 14B illustrate selected details of an embodiment of accuracy-enhanced scanning using an accuracy-enhanced MMRS. The accuracy-enhanced MMRS is illustrated by ring unit 110A (an accuracy-enhanced embodiment of ring unit 110) having rocker arms 810 and 811. The rocker arms serve as convenient controls, being enabled for squeezing by fingers adjacent to a finger the ring unit is worn on, enabling quick and convenient signaling of one or more actions by a user. The squeezing is recognized by circuitry (e.g. included in an accuracy-enhanced embodiment of UFL 1166 of FIG. 12), and communicated to an accuracy-enhanced scan engine (e.g. an accuracy-enhanced embodiment of scan engine 1150 of FIG. 12) a first and second actions. The accuracy-enhanced scan engine is enabled to provide a visual indicator in response to recognition of a first action of the user, and further enabled to scan in response to recognition of a second action of the user. In some embodiments, recognition of the first action is communicated between an accuracy-enhanced UFL and an accuracy-enhanced scan engine via an extended SSI command.

The accuracy-enhanced MMRS is illustrated in a context of object 1401 having two targets thereon illustrated by barcode1 1411 and barcode2 1412. FIG. 14A and FIG. 14B illustrate the accuracy-enhanced MMRS in respective first and second orientations 1421 and 1422 directed to scan, respectively, barcode1 and barcode2.

Figure 15B:
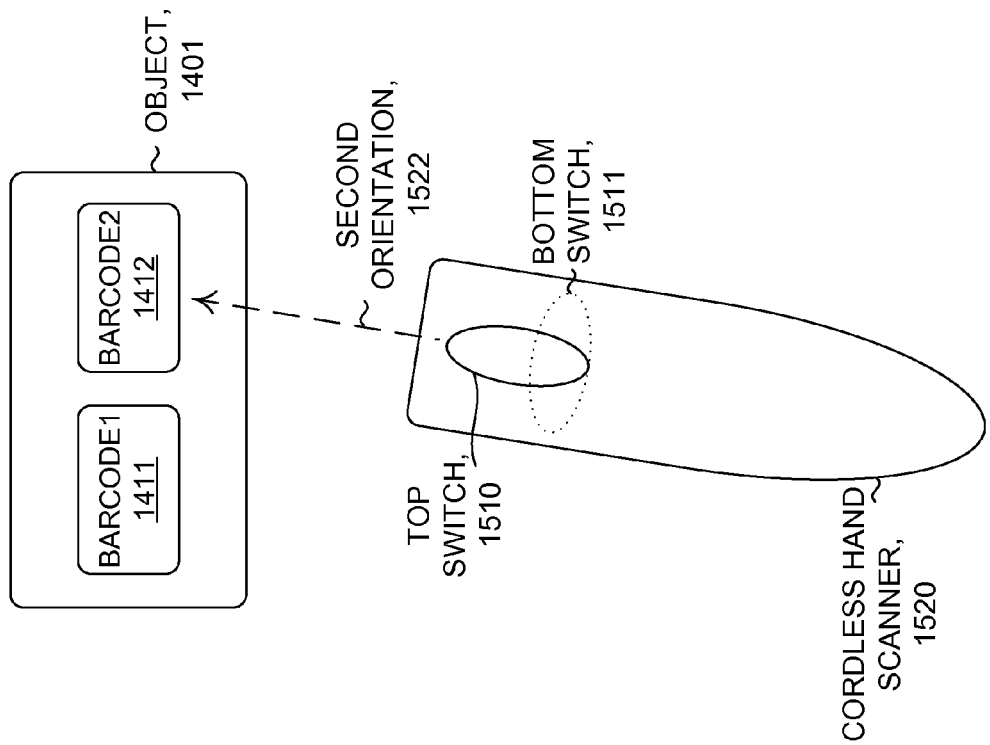
FIGS. 15A and 15B illustrate selected details of an embodiment of accuracy-enhanced scanning using an accuracy-enhanced cordless hand scanner.
Figure 15A:
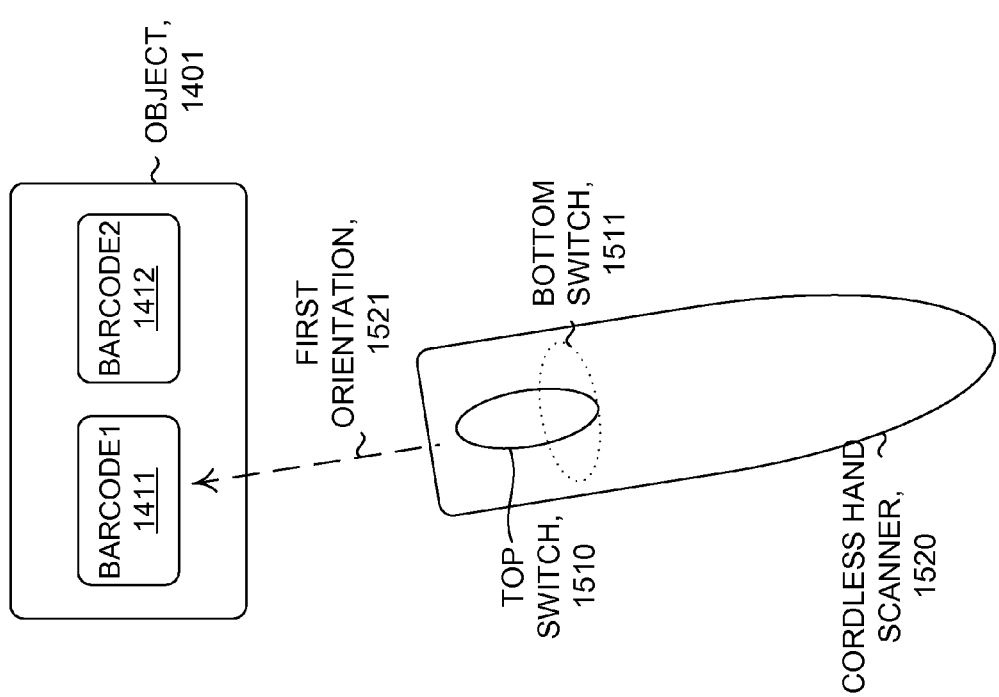

FIGS. 15A and 15B illustrate selected details of an embodiment of accuracy-enhanced scanning using an accuracy-enhanced cordless hand scanner. The accuracy-enhanced cordless hand scanner is illustrated by cordless hand scanner 1520, having top switch 1510 and bottom switch 1511. The cordless hand scanner is of a size, shape, and weight for convenient operation by holding in a single hand. The top switch is conveniently located, sized, and shaped for pressing by the thumb of the hand holding the scanner, and the bottom switch is conveniently located, sized, and shaped for pressing by a finger (such as an index or middle finger) of the hand holding the scanner. User-action-logic and/or -processing circuitry in the scanner enables recognition of partial or full pressing of the top and bottom switches as first and second user actions. The user-action-logic/processing circuitry is further enabled to communicate recognition of the actions to engine-circuitry (in the scanner) enabled to provide a visual indication and to perform a scan. The engine-circuitry includes an optical scan engine (such as a laser scanning engine, a CCD scanning engine, or an imaged-based scanning engine), having capabilities to provide the visual indication and to carry out the scan.

As in FIG. 14A, illustrated context includes object 1401 with targets barcode1 1411 and barcode2 1412. FIG. 15A and FIG. 15B illustrate the accuracy-enhanced cordless hand scanner in respective first and second orientations 1521 and 1522 directed to scan, respectively, barcode1 and barcode2.

Figure 16B:
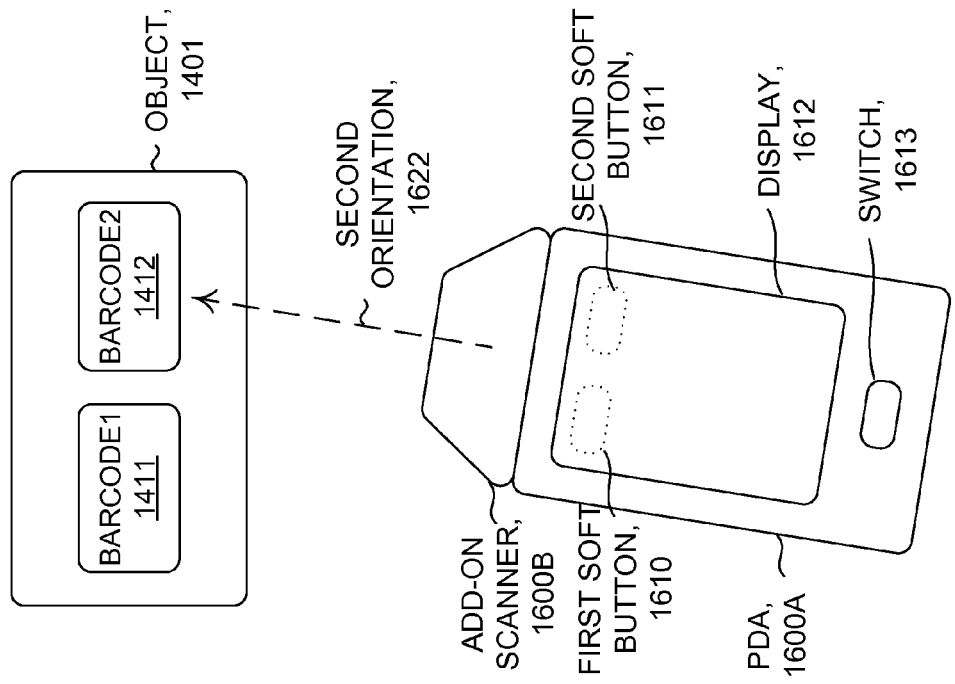
FIGS. 16A and 16B illustrate selected details of an embodiment of accuracy-enhanced scanning using an accuracy-enhanced handheld scanning system.
Figure 16A:
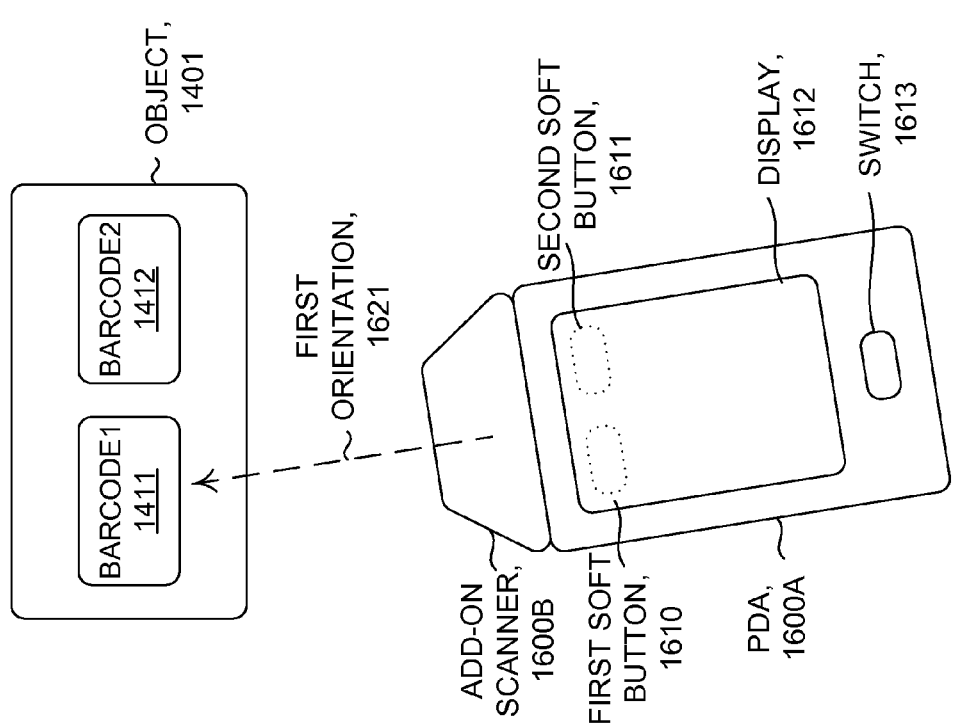

FIGS. 16A and 16B illustrate selected details of an embodiment of accuracy-enhanced scanning using an accuracy-enhanced handheld scanning system. The accuracy-enhanced handheld scanning system is illustrated by PDA 1600A with coupled add-on scanner 1600B. The PDA has display 1612 and switch 1613. The display is illustrated as showing first and second soft buttons 1610 and 1611.

The PDA includes a processor enabled to execute instructions (e.g. software) provided on a computer-readable media (such as one or more of a flash-memory, a write-once and/or read-only memory, or any type of non-volatile storage suitable for retention of program instructions and/or data). The software enables the PDA to provide functions including programmable or "soft" buttons (illustrated as first and second soft buttons 1610 and 1620). The software further enables the PDA to provide functions to recognize depressions, touches, and/or taps of a pressure- and/or touch-sensitive screen and/or display (such as display 1612) as first and second user actions. Alternatively, one or more depressions (full or partial) of switch 1613 are recognized as either or both of the user actions. The recognizable taps include single-taps (e.g. touching the screen one time) and double-taps (e.g. touching the screen two times in relatively rapid succession). The software, operating in conjunction with interface circuitry of the PDA, further enables the PDA to communicate recognition of the first and second user actions to the add-on scanner.

The add-on scanner is enabled, in response to receiving recognition of the first user action, to provide a visual indicator. The add-on scanner is further enabled, in response to receiving recognition of the second user action, to carry out a scan (such as an optical scan). The add-on scanner includes one or more of a as a laser scanning engine, a CCD scanning engine, and an imaged-based scanning engine, each enabled to provide the visual indicator and to carry out the scan.

FIG. 16A and FIG. 16B illustrate the PDA and add-on scanner in respective first and second orientations 1621 and 1622 directed to scan, respectively, barcode1 and barcode2.

Figure 17:
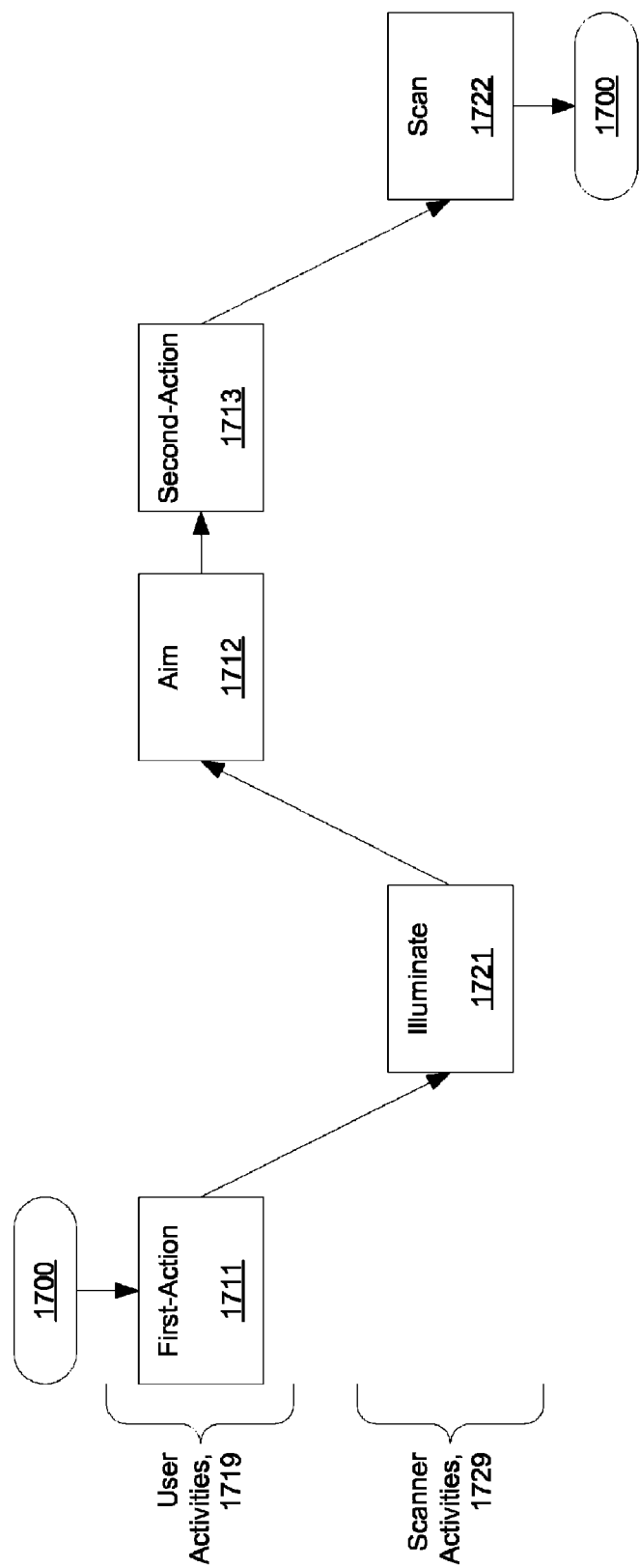
FIG. 17 is a flow diagram illustrating an embodiment of accuracy-enhanced scanning.

FIG. 17 is a flow diagram illustrating an embodiment of accuracy-enhanced scanning. User activities 1719 of accuracy-enhanced scanning are performed by a user, while scanner activities 1729 are performed by a scanner being used by the user. Flow begins conceptually at operation 1700, corresponding to waiting for a (or another) aiming/scanning operation to be initiated by the user. The user performs First-Action 1711 to initiate the aiming portion of the aiming/scanning operation. The first-action is recognized by the scanner, and in response the scanner provides illumination as illustrated by Illuminate 1721. In response to and with the aid of the illumination, the user aims the scanner, as illustrated by Aim 1712. When the aiming is completed, the user performs Second-Action 1713 to initiate the scanning portion of the aiming/scanning operation. The second-action is recognized by the scanner, and in response the scanner scans as illustrated by Scan 1722. Flow then conceptually returns to operation 1700, corresponding to waiting for another aiming/scanning operation to be initiated by the user.

In an embodiment with the accuracy-enhanced MMRS illustrated in FIGS. 14A and 14B, First-Action 1711 is indicated, for example, by depressing or squeezing rocker arm 810 (or alternatively rocker arm 811). In response, an illumination is provided toward barcode1 1411, as the ring unit is oriented thereto as illustrated by first orientation 1421 of FIG. 14A. The user, however, desires a scan of barcode2 1412 (such as after previously scanning barcode1 1411), and therefore the user orients the ring unit toward barcode2 1412, as illustrated by second orientation 1422 of FIG. 14B. Second-Action 1712 is indicated, for example, by depressing or squeezing rocker arm 811 (or alternatively rocker arm 812). In response, scanning is performed in accordance with second orientation 1422.

In an embodiment with the accuracy-enhanced cordless hand scanner illustrated in FIGS. 15A and 15B, First-Action 1711 is indicated, for example, by pressing top switch 1510 (or alternatively bottom switch 1511). In response, an illumination is provided toward barcode1 1411, and the user orients the cordless hand scanner toward barcode2 1412, as illustrated by second orientation 1522 of FIG. 15B. Second-Action 1712 is indicated, for example, by pressing bottom switch 1511 (or alternatively top switch 1510). In response, scanning is performed in accordance with second orientation 1522. For another example, the First-Action is indicated by partially pressing top switch 1510 (or alternatively bottom switch 1511), and the Second-Action is indicated by fully pressing top switch 1510 (or alternatively bottom switch 1511).

In an embodiment with the accuracy-enhanced handheld scanning system illustrated in FIGS. 16A and 16B, First-Action 1711 is indicated, for example, by tapping first soft button 1610 (or alternatively second soft button 1611). In response, an illumination is provided toward barcode1 1411, and the user orients the PDA and add-on scanner toward barcode2 1412, as illustrated by second orientation 1622 of FIG. 16B. Second-Action 1712 is indicated, for example, by pressing second soft button 1611 (or alternatively first soft button 1610). In response, scanning is performed in accordance with second orientation 1622. For another example, the First-Action is indicated by single-tapping first soft button 1610 (or alternatively second soft button 1611), and the Second-Action is indicated by double-tapping first soft button 1610 (or alternatively second soft button 1611). For another example, either or both of the First-Action and the Second-Action is indicated by full and/or partial depressing of switch 1613.

Example Implementation Techniques

In various embodiments, various combinations of all or portions of functions and/or operations performed by a network interface (such as LAN/WAN Interface 1230 of FIG. 12), a communication module (such as Wireless Module 1220 or WM 1165 of FIG. 12), a logic module (such as UFL 1166 of FIG. 12), and an interface or scan engine (such as ESE 1167 or scan engine 1150 of FIG. 12) are implemented via one or more programmable processing elements.

In some embodiments, various combinations of all or portions of functions performed by a network interface (such as LAN/WAN Interface 1230 of FIG. 12), a processor (such as Host Processor 1210 of FIG. 12), a communication module (such as Wireless Module 1220 or WM 1165 of FIG. 12), a logic module (such as UFL 1166 of FIG. 12), an interface or scan engine (such as ESE 1167 or scan engine 1150 of FIG. 12), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a flow diagram (such as the improved user feedback of FIG. 13 or the accuracy-enhanced scanning of FIG. 17), operations performed by an element having one or more (programmable) processors (such as Host Processor 1210 of FIG. 12, or PDA 1600A of FIGS. 16A and 16B), and operations performed at least in part (in various embodiments) via one or more programmable processing elements (such as LAN/WAN Interface 1230 of FIG. 12, Wireless Module 1220 or WM 1165 of FIG. 12, UFL 1166 of FIG. 12, and ESE 1167 or scan engine 1150 of FIG. 12), are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

Conclusion

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as a type, a size, a configuration, or a pinout of a connector; a type or a size of a cable; a form factor or physical dimensions of a card; types of radio circuitry or frequencies of radio transmission or reception; a type of processor or a nature of control circuitry; a manner of wearing or attaching a ring unit to a finger; a manner of wearing or attaching a wrist unit; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A multi-mode ring scan-target imaging device comprising:
a ring unit comprising at least two switches each concurrently independently settable in a plurality of respective states at least in part via respective digits of a hand,
aiming circuitry, and
scan-target imaging circuitry;
wherein the ring unit, at least partially in response to the settings of the states, is operable in a selected one of at least an aiming mode and an imaging mode;
wherein the ring unit further is compatible with wearing on at least one digit of the hand and is enabled to initiate the aiming mode separately from and prior to initiating the imaging mode; and
wherein the aiming circuitry is enabled to illuminate a scan target with a pattern comprising at least one line while operating in accordance with the aiming mode and the scan-target imaging circuitry is enabled to image the scan target while operating in accordance with the imaging mode.

2. The multi-mode ring scan-target imaging device of claim 1, wherein one of the respective digits is a thumb of the hand and another one of the respective digits is a finger of the hand.

3. The multi-mode ring scan-target imaging device of claim 1, wherein a first one of the states corresponds to a contact of one of the switches being closed, and a second one of the states corresponds to the contact being open.

4. The multi-mode ring scan-target imaging device of claim 1, wherein a first one of the states corresponds to a particular one of the switches being partially depressed, and a second one of the states corresponds to the particular switch being fully depressed.

5. The multi-mode ring scan-target imaging device of claim 1, further comprising a wrist unit coupled to the ring unit and enabled to operate in accordance with the modes.

6. The multi-mode ring scan-target imaging device of claim 1, further comprising a wireless interface enabled to convey host processor destined scan data from the scan-target imaging circuitry to a host processor and to convey host processor originated commands from the host processor to elements of the multi-mode ring scan-target imaging device.

7. The multi-mode ring scan-target imaging device of claim 6, further comprising a scan status indicator controlled at least in part by a scan confirmation field of one of the host processor originated commands, and wherein the scan confirmation field is enabled to indicate whether or not the host processor successfully received the host processor destined scan data.

8. The multi-mode ring scan-target imaging device of claim 1, wherein the scan-target imaging circuitry is further enabled to operate with one or more of
a laser-based engine,
a Charge Coupled Device (CCD)-based engine, and
an image-based engine.

9. A method comprising:
determining a plurality of respective states of respective switches that are concurrently independently settable at least in part via respective digits of a hand;
determining, based at least in part on the respective states of the switches, a selected one of a plurality of modes to operate a multi-mode ring scanner in, a first one of the modes being an aiming mode and a second one of the modes being a scan-target imaging mode;
providing, while operating in the aiming mode, a visible indicator in a direction corresponding to a potential direction for imaging, the visible indicator having a pattern comprising at least one line;
performing the imaging while operating in the scan-target imaging mode; and
wherein the multi-mode ring scanner comprises circuitry that is enabled to perform the determining of the selected mode and a ring unit comprising the switches, and the multi-mode ring scanner is compatible with wearing on at least one digit of the hand and is enabled to initiate the aiming mode separately from and prior to initiating the scan-target imaging mode.

10. The method of claim 9, wherein one of the respective digits is a thumb of the hand and another one of the respective digits is a finger of the hand.

11. The method of claim 9, wherein a first one of the states corresponds to a contact of one of the switches being closed, and a second one of the states corresponds to the contact being open.

12. The method of claim 9, wherein a first one of the states corresponds to a particular one of the switches being partially depressed, and a second one of the states corresponds to the particular switch being fully depressed.

13. The method of claim 9, further comprising conveying host processor destined scan data produced by the scan-target imaging to a host processor via a wireless interface.

14. The method of claim 13, further comprising conveying host processor originated commands from the host processor to the multi-mode ring scanner via the wireless interface.

15. The method of claim 14, further comprising setting a scan confirmation field of one of the host processor originated commands to indicate whether or not the host processor successfully received the host processor destined scan data and controlling a scan status indicator based at least in part on the scan confirmation field.

16. A scan-target imaging system comprising:
a scan engine enabled to perform scan-target imaging in a particular direction and to perform target illuminating in the particular direction, wherein the illuminating is shaped comprising at least one line;
a wireless interface to couple the scan engine to a wireless enabled host;
a scan status indicator;
a housing at least partially containing the scan engine, the wireless interface, and the scan status indicator, the housing being compatible with handheld operation;
wherein state of the scan status indicator is alterable in response to scan confirmation status embedded in a command stream sent by the host and received via the wireless interface; and
wherein the scan engine is enabled to perform the scan-target imaging and the illuminating independently of each other and is enabled to initiate the illuminating prior to initiating the scan-target imaging.

17. The scan-target imaging system of claim 16, wherein the scan status indicator comprises one or more lights.

18. The scan-target imaging system of claim 16, wherein the shape of the illuminating further comprises one or more of
another line,
a dot,
one or more concentric circles, and
cross-hairs.

19. The scan-target imaging system of claim 16, wherein the wireless interface is compatible with at least one of
Bluetooth wireless technology,
ZigBee wireless technology,
WiFi wireless technology, and
infrared wireless technology.

20. The scan-target imaging system of claim 16, wherein the scan engine comprises one or more of a laser-based engine,
a Charge Coupled Device (CCD)-based engine, and
an image-based engine.

21. A multi-mode ring scan-target imaging device comprising:
   a ring unit comprising
      at least two switches each concurrently independently settable in a plurality of respective states at least in part via respective digits of a hand,
      aiming circuitry, and
      scan-target imaging circuitry;
   wherein the ring unit is enabled to operate in a selected one of at least an aiming mode and a scan-target imaging mode, and enabled to be worn on at least one digit of the hand; and
   wherein the aiming circuitry is enabled to illuminate a scan-target with a pattern comprising at least one line and the scan-target imaging circuitry is enabled to image the scan-target, and the aiming circuitry is enabled to illuminate the scan-target separately from and prior to the scan-target imaging circuitry initiating the imaging of the scan-target.

22. The multi-mode ring scan-target imaging device of claim 21, wherein one of the respective digits is a thumb of the hand and another one of the respective digits is a finger of the hand.

23. The multi-mode ring scan-target imaging device of claim 21, wherein a first one of the states corresponds to a contact of one of the switches being closed, and a second one of the states corresponds to the contact being open.

24. The multi-mode ring scan-target imaging device of claim 21, further comprising a wrist unit coupled to the ring unit and enabled to operate in accordance with the modes.

25. A method comprising:
   determining a plurality of respective states of respective switches that are concurrently independently settable at least in part via respective digits of a hand;
   determining, based at least in part on the respective states of the switches, a selected one of a plurality of modes to operate a multi-mode ring scanner in;
   wherein a first one of the modes is an aiming mode and a second one of the modes is a scan-target imaging mode, the aiming mode comprising generating a visible pattern comprising at least one line;
   wherein the multi-mode ring scanner comprises a ring unit comprising the switches and adapted to be worn on at least one digit of the hand; and
   wherein the ring unit further comprises processing circuitry that is enabled to perform the determining of the selected mode, and the ring unit is enabled to initiate the aiming mode separately from and prior to initiating the scan-target imaging mode.

26. The method of claim 25, further comprising while in the aiming mode, illuminating a scan target.

27. The method of claim 25, further comprising while in the scan-target imaging mode, imaging a scan target.

28. The method of claim 25, further comprising setting the respective states of the respective switches via the respective digits of the hand.

* * * * *